United States Patent
Keys et al.

(10) Patent No.: US 12,260,127 B2
(45) Date of Patent: Mar. 25, 2025

(54) TECHNOLOGIES FOR STORAGE AND PROCESSING FOR DISTRIBUTED FILE SYSTEMS

(71) Applicant: Intel Corporation, Santa Clara, CA (US)

(72) Inventors: John S. Keys, Beaverton, OR (US); Daniel R. McLeran, Loveland, CO (US); Ian F. Adams, Astoria, OR (US); Michael P. Mesnier, Scappoose, OR (US); Nilesh N. Shah, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 935 days.

(21) Appl. No.: 17/132,974

(22) Filed: Dec. 23, 2020

(65) Prior Publication Data

US 2021/0117134 A1    Apr. 22, 2021

(51) Int. Cl.
*G06F 3/06* (2006.01)

(52) U.S. Cl.
CPC .......... *G06F 3/0667* (2013.01); *G06F 3/0613* (2013.01); *G06F 3/064* (2013.01);
(Continued)

(58) Field of Classification Search
CPC ...... G06F 3/0667; G06F 3/0613; G06F 3/064; G06F 3/0646; G06F 3/067; G06F 3/0679
See application file for complete search history.

(56) References Cited

U.S. PATENT DOCUMENTS

| | | | |
|---|---|---|---|
| 5,546,558 A * | 8/1996 | Jacobson | G11B 20/1833 714/E11.034 |
| 6,701,316 B1 | 3/2004 | Li et al. | |

(Continued)

FOREIGN PATENT DOCUMENTS

| | | |
|---|---|---|
| JP | 2006277583 A | 10/2006 |
| JP | 2010146549 A | 7/2010 |

(Continued)

OTHER PUBLICATIONS

EPO; Extended European Search Report issued in EP Patent Application No. 22164358.8, dated Jul. 18, 2022; 7 pages.

(Continued)

*Primary Examiner* — Jae U Yu
(74) *Attorney, Agent, or Firm* — Alliance IP, LLC

(57) ABSTRACT

Techniques for storage and processing for distributed file systems are disclosed. In the illustrative embodiment, padding is placed between data elements in a file to be stored on a distributed file system. The file is to be split into several objects in order to be stored in the distributed file system, and the padding is used to prevent a data element from being split across two different objects. The objects are stored on data nodes, which analyze the objects to determine which data elements are present in the object as well at the location of those objects. The location of the objects is saved on the data storage device, and those locations can be used to perform queries on the data elements in the object on the data storage device itself. Such an approach can reduce transfer of data elements from data storage to local memory of the data node.

19 Claims, 18 Drawing Sheets

(52) U.S. Cl.
CPC ............ *G06F 3/0646* (2013.01); *G06F 3/067* (2013.01); *G06F 3/0679* (2013.01)

(56) References Cited

U.S. PATENT DOCUMENTS

| | | |
|---|---|---|
| 2006/0047897 A1 | 3/2006 | Thiessen et al. |
| 2012/0079190 A1 | 3/2012 | Colgrove et al. |
| 2017/0277432 A1 | 9/2017 | Yun et al. |
| 2018/0341548 A1 | 11/2018 | Bolkhovitin et al. |
| 2018/0341606 A1 | 11/2018 | Bolkhovitin et al. |
| 2019/0042093 A1 | 2/2019 | Adams et al. |
| 2019/0042591 A1 | 2/2019 | Dayan et al. |
| 2019/0266062 A1* | 8/2019 | Borlick ................. G06F 3/0665 |
| 2020/0167098 A1 | 5/2020 | Shah et al. |

FOREIGN PATENT DOCUMENTS

| | | |
|---|---|---|
| JP | 2019028572 A | 2/2019 |
| KR | 20070024670 A | 3/2007 |
| WO | 2018217273 A1 | 11/2018 |

OTHER PUBLICATIONS

EPO; Extended European Search Report issued in EP Patent Application No. 20769555.2, dated Nov. 7, 2022; 7 pages.

USPTO Non-Final OA for U.S. Appl. No. 17/430,693 entitled, Computational Data Storage Systems (11 pages).

Adams, et al., "Respecting the block interface—computational storage using virtual objects," Intel Labs, available at https://www.usenix.org/system/files/hotstorage19-paper-adams.pdf (7 pgs.).

PCT Patent Application No. PCT/US20/22432 by Michael Mesnier, John Keys, Ian Adams, Yi Zou, Lay Kong, Daniel Robert McLeran, Mariusz Barczak, Arun Raghunath, and Luis Maria Remis, filed Mar. 12, 2020.

Barbalance, Antonio, et al., "blockNDP: Block-storage Near Data Processing," Middleware '20 Industrial Track, Dec. 7-11, 2020, Delft, Netherlands. (8 pages).

LeFevre, Jeff, et al., "Skyhook: Programmable Storage for Databases," USENIX, Feb. 26, 2019. (3 pages).

Mehra, Pankaj, "Scaling Smart: East-West & North-South Scaling of Computation With Data," Samsung Electronics, Nov. 5, 2020. (29 pages).

Mellor, Chris, "At exabyte levels, data gravity exerts an enormous pull. This sucks," Blocks & Files, Jan. 12, 2021. (4 pages).

PCT International Preliminary Report on Patentability issued in PCT/US2020/022432, dated Sep. 23, 2021; 7 pages.

PCT International Search Report and Written Opinion in PCT International Application Serial No. PCT/US2020/022432 mail on Jul. 6, 2020; 9 pages.

Do, Jaeyoung, et al. "Query Processing on Smart SSDs: Opportunities and Challenges." Proceedings of the 2013 ACM SIGMOD International Conference on Management of Data, Association for Computing Machinery, 2013, pp. 1221-1230. ACM Digital Library, https://doi.org/10.1145/2463676.2465295.

Japan Patent Office; Office Action issued for JP Patent Application No. 2021-546735, dated Apr. 2, 2024; 9 pages including English translation.

USPTO Non-Final OA for U.S. Appl. No. 17/430,693 entitled, Computational Data Storage Systems (10 pages).

* cited by examiner

TECHNOLOGIES FOR STORAGE AND PROCESSING FOR DISTRIBUTED FILE SYSTEMS

BACKGROUND

Distributed file systems such as Hadoop Distributed File System (HDFS) can improve storage and processing time for various operations. Data for a large file can be split to several different nodes, each of which can perform queries or otherwise process part of the large file. Such an approach can reduce network bandwidth required to query such a file by reducing or eliminating the need to send the file over a network in order to process it.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
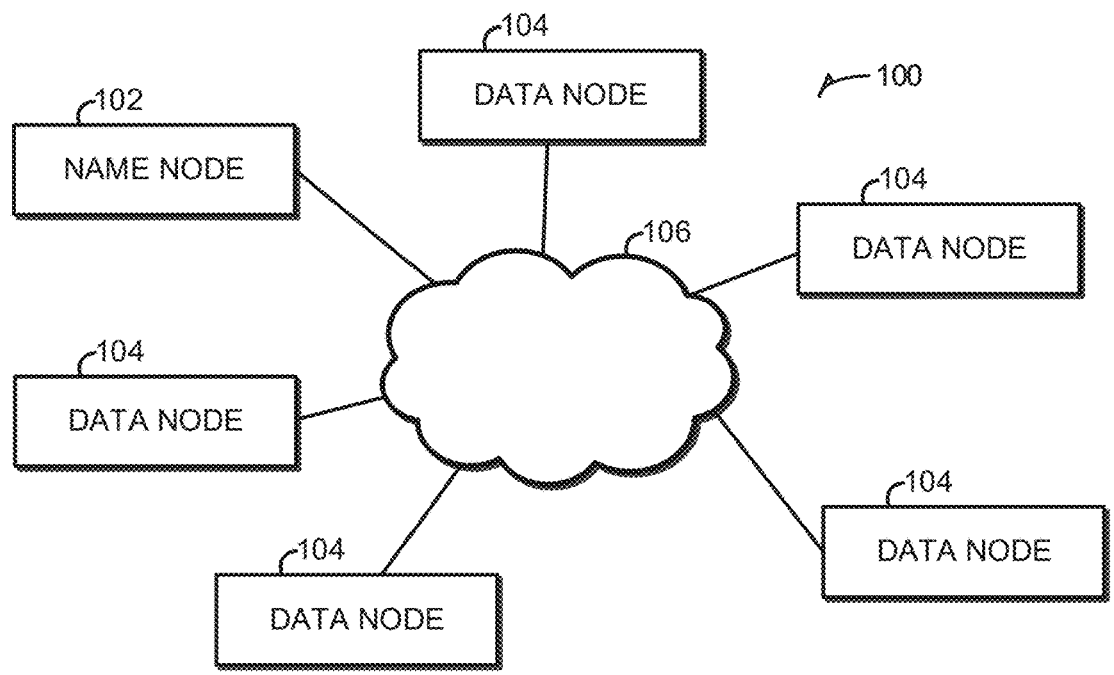
FIG. 1 is a simplified block diagram of at least one embodiment of a name node and several compute nodes of a distributed file system connected by a network.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 includes a name node 102 and several data nodes 104 connected by a network 106. In the illustrative embodiment, the name node 102 saves a file in a distributed file system (DFS), such as a Hadoop Distributed File System (HDFS). The name node 102 includes several data elements in the file, such as several images. The illustrative HDFS is configured to split each file into several objects of a particular size (such as 128 megabytes), which are then sent to different data nodes 104. The name node 102 constructs the file to be saved such that no data element crosses a boundary between different objects. As a result, when the file is split into objects and sent to each data nodes 104, each data element is stored in one data node 104 and not split between different data nodes 104.

When a data node 104 receives an object of a file, it prepares the object for storage. The data node 104 determines what data elements are present in the object and creates a manifest that includes a list of the data elements and their location in the object. The manifest is stored with the object in a file of a local file system.

The data nodes 104 storing data elements can be given a query for those data elements, such as a query for a particular string in a text or a query to perform a particular image recognition algorithm on an image. The data node 104 accesses the manifest to determine where in the local file the data elements are stored. The data node 104 determines the block mapping for the data elements in the local data storage. The data node 104 can create a virtual object for each data elements that indicates the block mapping for that data element. The data node 104 can then create an instruction to the local data storage device to perform a query on the data element based on the block mapping for that data element. The local data storage device can then perform the query and pass the results back to the data node 104, which can return the results for the query. It should be appreciated that, by performing the query at the local data storage device, the data being queried does not need to be sent over any interconnect or network but rather can be processed close to its current location. Such an approach can reduce pressure on network and/or local interconnect buses, reduce cache pollution, and reduce power consumption. In the illustrative embodiment, the data storage device is local to the data node 104 that sends the query to the data storage device. In other embodiments, the data storage device may be remote from the data node 104, and the data node 104 may be connected to the data storage device over a fabric or network.

The system 100 may receive or perform a query for any suitable purpose. For example, in some embodiments, cyclic redundancy check (CRC) computations may be performed periodically in order to ensure that the stored data remains correct. In another embodiment, the system 100 may perform queries on data to perform inference on batch images, annotate metadata with results, update or tag images with metadata for future rich metadata searches with pre-inferred images or data.

In one embodiment, a data node 102 may include one or more key-value field programmable gate arrays (KV FPGAs) that may be embodied as, e.g., an FPGA and solid state drive (SSD) on a PCIe card. Performing queries on the objects at the KV FPGA can provide KV object awareness down to the FPGA level.

Figure 2A:
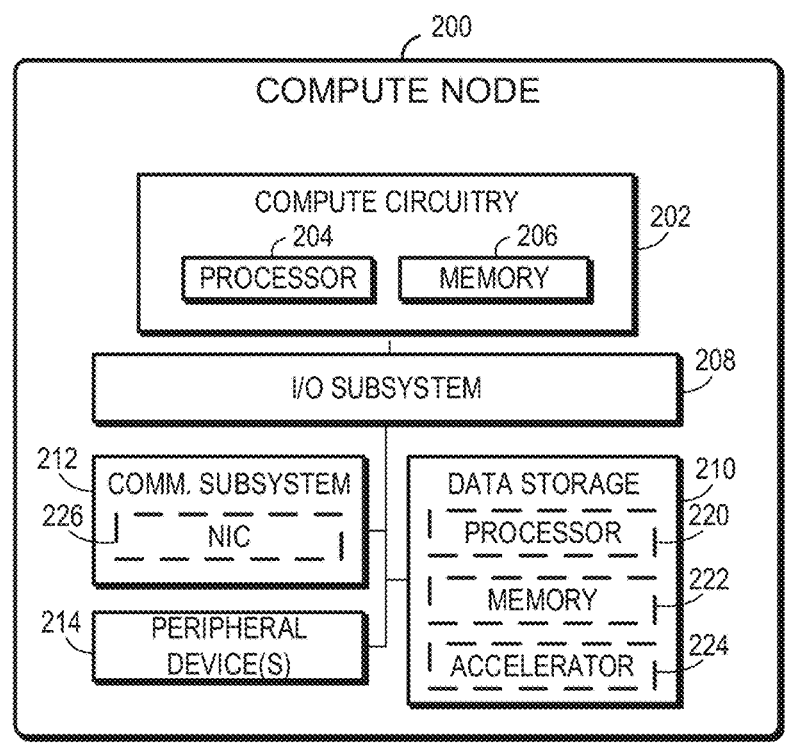
FIG. 2A is a simplified block diagram of at least one embodiment of a compute node of FIG. 1.
Figure 2B:
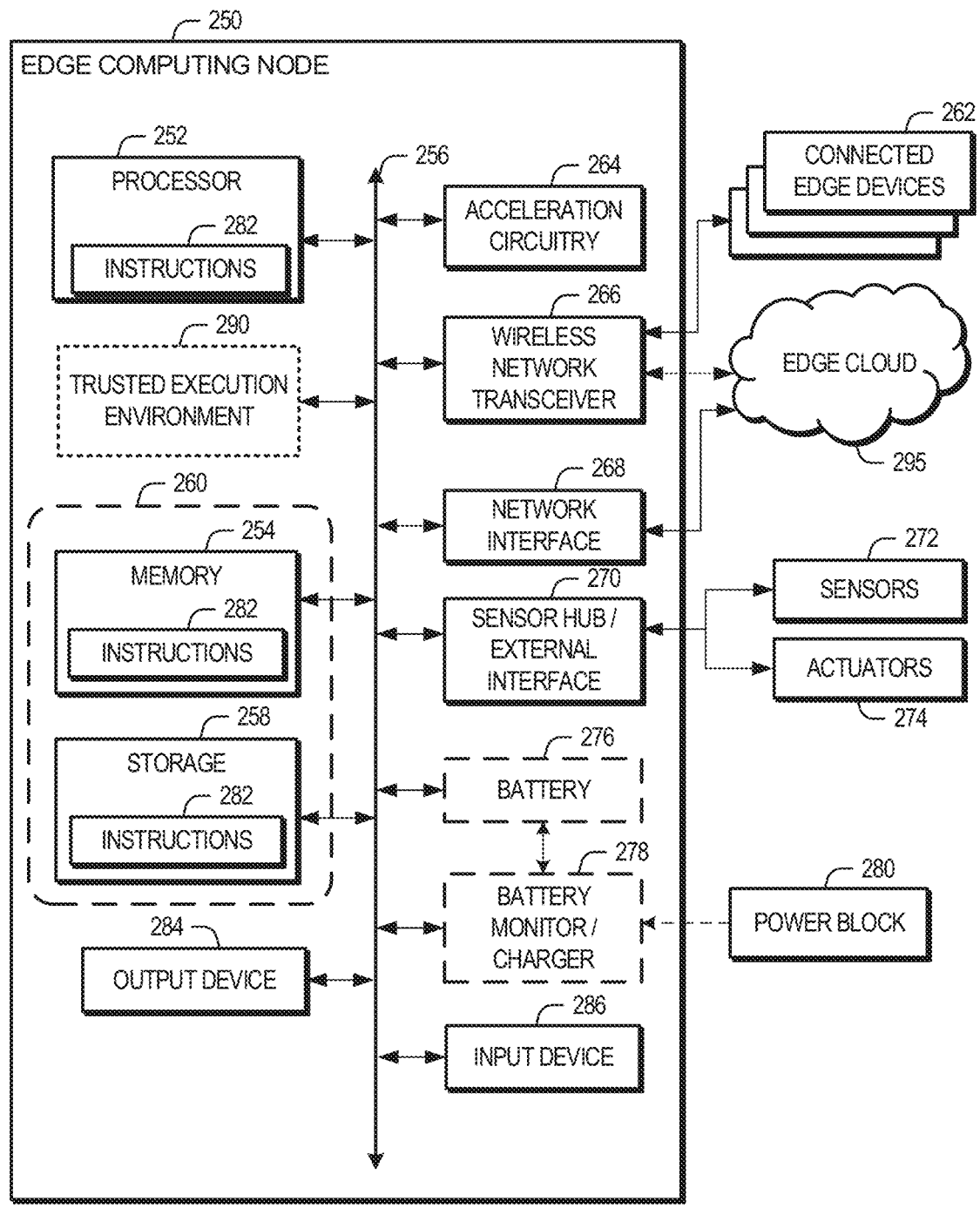
FIG. 2B provides a further overview of example components within a compute node of FIG. 1.

Each of the name node 102 and the data nodes 104 may be embodied as any suitable compute node, such as the compute node 200 shown in FIG. 2A or the edge computing node 250 shown in FIG. 2B. The name node 102 and/or the data nodes 104 may be embodied in or form a part of an edge computing system, a data center computing system, or any other suitable computing system.

In further examples, any of the compute nodes (e.g., the name node 102 and/or the data nodes 104) or devices discussed with reference to the present edge computing systems and environment may be fulfilled based on the components depicted in FIGS. 2A and 2B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

In the simplified example depicted in FIG. 2A, an edge compute node 200 includes a compute engine (also referred to herein as "compute circuitry") 202, an input/output (I/O) subsystem 208, data storage 210, a communication circuitry subsystem 212, and, optionally, one or more peripheral devices 214. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 200 may be embodied as any type of engine, device, or collection of devices capable of performing various compute functions. In some examples, the compute node 200 may be embodied as a single device such as an integrated circuit, an embedded system, a field-programmable gate array (FPGA), a system-on-a-chip (SOC), or other integrated system or device. In the illustrative example, the compute node 200 includes or is embodied as a processor 204 and a memory 206. The processor 204 may be embodied as any type of processor capable of performing the functions described herein (e.g., executing an application). For example, the processor 204 may be embodied as a multi-core processor(s), a microcontroller, a processing unit, a specialized or special purpose processing unit, or other processor or processing/controlling circuit.

In some examples, the processor 204 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 204 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 204 may work in coordination with each other to execute many types of operations and instructions within and on behalf of the compute node 200.

The memory 206 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 206 may be integrated into the processor 204. The memory 206 may store various software and data used during operation such as one or more applications, data operated on by the application(s), libraries, and drivers.

The compute circuitry 202 is communicatively coupled to other components of the compute node 200 via the I/O subsystem 208, which may be embodied as circuitry and/or components to facilitate input/output operations with the compute circuitry 202 (e.g., with the processor 204 and/or the main memory 206) and other components of the compute circuitry 202. For example, the I/O subsystem 208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 208 may form a portion of a system-on-a-chip (SoC) and be incorporated, along with one or more of the processor 204, the memory 206, and other components of the compute circuitry 202, into the compute circuitry 202.

The one or more illustrative data storage devices 210 may be embodied as any type of devices configured for short-term or long-term storage of data such as, for example, memory devices and circuits, memory cards, hard disk drives, solid-state drives, or other data storage devices. Individual data storage devices 210 may include a system partition that stores data and firmware code for the data storage device 210. Individual data storage devices 210 may also include one or more operating system partitions that store data files and executables for operating systems depending on, for example, the type of compute node 200.

In some embodiments, the data storage device 210 may include a processor 220, a memory 222, and an accelerator 224. The processor 220 and/or memory 222 may be similar to the processor 204 and/or the memory 206, a description of which will not be repeated in the interest of clarity. Of course, in some embodiments, the capacity, speed, bandwidth, etc., of the processor 220 and/or the memory 222 may be different from that of the processor 204 and/or the memory 206, respectively. The accelerator 224 may be embodied as any circuit or circuits that can accelerate certain compute tasks. For example, the accelerator 224 may be embodied as a field programmable gate array (FPGA), an application specific integrated circuit (ASIC), a graphics processing unit (GPU), a general purpose graphics processing unit (GPGPU), etc.

In the illustrative embodiment, the data storage device 210 and, if present, the processor 220, the memory 222, and the accelerator 224 are all enclosed in a storage device chassis or storage device enclosure that separates the storage device 210 from other components of the compute node 200, such as the compute circuitry 202.

In the illustrative embodiment, the data storage device 210 may be local to the other components of the compute node 200, such as the compute circuitry 202. Additionally or alternatively, the data storage device 210 may connected to other components of the compute node 200, such as the compute circuitry 202, over a network or fabric, such as in a Storage Area Network (SAN) or other disaggregated block storage environment. The data storage device 210 may be connected to or accessed with any suitable connection or protocol, such as internet small compute systems interface (iSCSI) or non-volatile memory express over fabric (NVMeoF).

The communication circuitry 212 may be embodied as any communication circuit, device, or collection thereof, capable of enabling communications over a network between the compute circuitry 202 and another compute device (e.g., an edge gateway of an implementing edge computing system). The communication circuitry 212 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 212 includes a network interface controller (NIC) 226, which may also be referred to as a host fabric interface (HFI). The NIC 226 may be embodied as one or more add-in-boards, daughter cards, network interface cards, controller chips, chipsets, or other devices that may be used by the compute node 200 to connect with another compute device (e.g., an edge gateway node). In some examples, the NIC 226 may be embodied as part of a system-on-a-chip (SoC) that includes one or more processors, or included on a multichip package that also contains one or more processors. In some examples, the NIC 226 may include a local processor (not shown) and/or a local memory (not shown) that are both local to the NIC 226. In such examples, the local processor of the NIC 226 may be capable of performing one or more of the functions of the compute circuitry 202 described herein. Additionally, or alternatively, in such examples, the local memory of the NIC 226 may be integrated into one or more components of the client compute node at the board level, socket level, chip level, and/or other levels.

Additionally, in some examples, a respective compute node 200 may include one or more peripheral devices 214. Such peripheral devices 214 may include any type of peripheral device found in a compute device or server such as audio input devices, a display, other input/output devices, interface devices, and/or other peripheral devices, depending on the particular type of the compute node 200. In further examples, the compute node 200 may be embodied by a respective edge compute node (whether a client, gateway, or aggregation node) in an edge computing system or like forms of appliances, computers, subsystems, circuitry, or other components.

It should be appreciated that, in some embodiments, various components of the compute node 200 may be disaggregated from each other. For example, in one embodiment, the compute circuitry 202 of a data node 104 may be located on one sled of a rack of a data center, and the data storage 210 of the data node 104 may be located on a different sled of the same rack or on a different sled of a different rack of the data center.

It should be further appreciated that, in some embodiments, the particular hardware for the name node 102 may be different from the various data nodes 104. For example, in some embodiments, the name node 102 may include relatively powerful compute circuitry 202 while the data node 104 may include less powerful compute circuitry 202. At the same time, the data node 104 may include data storage 210 that has more storage or more capability than data storage 210 in the name node 102 (or the name node 102 may not include a data storage 210). For example, the data node 104 may include a data storage 210 with a processor 220, a memory 222, and an accelerator 224, while the name node 102 has a data storage 210 without those components.

In a more detailed example, FIG. 2B illustrates a block diagram of an example of components that may be present in an edge computing node 250 for implementing the techniques (e.g., operations, processes, methods, and methodologies) described herein. This edge computing node 250 provides a closer view of the respective components of node 200 when implemented as or as part of a computing device (e.g., as a mobile device, a base station, server, gateway, etc.). The edge computing node 250 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 250, or as components otherwise incorporated within a chassis of a larger system.

The edge computing device 250 may include processing circuitry in the form of a processor 252, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 252 may be a part of a system on a chip (SoC) in which the processor 252 and other components are formed into a single integrated circuit, or a single package, such as the Edison™ or Galileo™ SoC boards from Intel Corporation, Santa Clara, California. As an example, the processor 252 may include an Intel® Architecture Core™ based CPU processor, such as a Quark™, an Atom™ an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 252 and accompanying circuitry may be provided in a single socket form factor, multiple socket form factor, or a variety of other formats, including in limited hardware configurations or configurations that include fewer than all elements shown in FIG. 2B.

The processor 252 may communicate with a system memory 254 over an interconnect 256 (e.g., a bus). Any number of memory devices may be used to provide for a given amount of system memory. As examples, the memory 254 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 258 may also couple to the processor 252 via the interconnect 256. In an example, the storage 258 may be implemented via a solid-state disk drive (SSDD). Other devices that may be used for the storage 258 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 258 may be on-die memory or registers associated with the processor 252. However, in some examples, the storage 258 may be implemented using a micro hard disk drive (HDD). Further, any number of new technologies may be used for the storage 258 in addition to, or instead of, the technologies described, such resistance change memories, phase change memories, holographic memories, or chemical memories, among others.

The components may communicate over the interconnect 256. The interconnect 256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 256 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 256 may couple the processor 252 to a transceiver 266, for communications with the connected edge devices 262. The transceiver 266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 262. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 266 (or multiple transceivers) may communicate using multiple standards or radios for communications at a different range. For example, the edge computing node 250 may communicate with close devices, e.g., within about 10 meters, using a local transceiver based on Bluetooth Low Energy (BLE), or another low power radio, to save power. More distant connected edge devices 262, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 266 (e.g., a radio transceiver) may be included to communicate with devices or services in a cloud (e.g., an edge cloud 295) via local or wide area network protocols. The wireless network transceiver 266 may be a low-power wide-area (LPWA) transceiver that follows the IEEE 802.15.4, or IEEE 802.15.4g standards, among others. The edge computing node 250 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 266, as described herein. For example, the transceiver 266 may include a cellular transceiver that uses spread spectrum (SPA/SAS) communications for implementing high-speed communications. Further, any number of other protocols may be used, such as Wi-Fi® networks for medium speed communications and provision of network communications. The transceiver 266 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 268 may be included to provide a wired communication to nodes of the edge cloud 295 or to other devices, such as the connected edge devices 262 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 268 may be included to enable connecting to a second network, for example, a first NIC 268 providing communications to the cloud over Ethernet, and a second NIC 268 providing communications to other devices over another type of network.

Given the variety of types of applicable communications from the device to another component or network, applicable communications circuitry used by the device may include or be embodied by any one or more of components 264, 266, 268, or 270. Accordingly, in various examples, applicable means for communicating (e.g., receiving, transmitting, etc.) may be embodied by such communications circuitry.

The edge computing node 250 may include or be coupled to acceleration circuitry 264, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 256 may couple the processor 252 to a sensor hub or external interface 270 that is used to connect additional devices or subsystems. The devices may include sensors 272, such as accelerometers, level sensors, flow sensors, optical light sensors, camera sensors, temperature sensors, global navigation system (e.g., GPS) sensors, pressure sensors, barometric pressure sensors, and the like. The hub or interface 270 further may be used to connect the edge computing node 250 to actuators 274, such as power switches, valve actuators, an audible sound generator, a visual warning device, and the like.

In some optional examples, various input/output (I/O) devices may be present within or connected to, the edge computing node 250. For example, a display or other output device 284 may be included to show information, such as sensor readings or actuator position. An input device 286, such as a touch screen or keypad may be included to accept input. An output device 284 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 250. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 276 may power the edge computing node 250, although, in examples in which the edge computing node 250 is mounted in a fixed location, it may have a power supply coupled to an electrical grid, or the battery may be used as a backup or for temporary capabilities. The battery 276 may be a lithium ion battery, or a metal-air battery, such as a zinc-air battery, an aluminum-air battery, a lithium-air battery, and the like.

A battery monitor/charger 278 may be included in the edge computing node 250 to track the state of charge (SoCh) of the battery 276, if included. The battery monitor/charger 278 may be used to monitor other parameters of the battery 276 to provide failure predictions, such as the state of health (SoH) and the state of function (SoF) of the battery 276. The battery monitor/charger 278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 278 may communicate the information on the battery 276 to the processor 252 over the interconnect 256. The battery monitor/charger 278 may also include an analog-to-digital (ADC) converter that enables the processor 252 to directly monitor the voltage of the battery 276 or the current flow from the battery 276. The battery parameters may be used to determine actions that the edge computing node 250 may perform, such as transmission frequency, mesh network operation, sensing frequency, and the like.

A power block 280, or other power supply coupled to a grid, may be coupled with the battery monitor/charger 278 to charge the battery 276. In some examples, the power block 280 may be replaced with a wireless power receiver to obtain the power wirelessly, for example, through a loop antenna in the edge computing node 250. A wireless battery charging circuit, such as an LTC4020 chip from Linear Technologies of Milpitas, California, among others, may be included in the battery monitor/charger 278. The specific charging circuits may be selected based on the size of the battery 276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 258 may include instructions 282 in the form of software, firmware, or hardware commands to implement the techniques described herein. Although such instructions 282 are shown as code blocks included in the memory 254 and the storage 258, it may be understood that any of the code blocks may be replaced with hardwired circuits, for example, built into an application specific integrated circuit (ASIC).

In an example, the instructions 282 provided via the memory 254, the storage 258, or the processor 252 may be embodied as a non-transitory, machine-readable medium 260 including code to direct the processor 252 to perform electronic operations in the edge computing node 250. The processor 252 may access the non-transitory, machine-readable medium 260 over the interconnect 256. For instance, the non-transitory, machine-readable medium 260 may be embodied by devices described for the storage 258 or may include specific storage units such as optical disks, flash drives, or any number of other hardware devices. The non-transitory, machine-readable medium 260 may include instructions to direct the processor 252 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 282 on the processor 252 (separately, or in combination with the instructions 282 of the machine readable medium 260) may configure execution or operation of a trusted execution environment (TEE) 290. In an example, the TEE 290 operates as a protected area accessible to the processor 252 for secure execution of instructions and secure access to data. Various implementations of the TEE 290, and an accompanying secure area in the processor 252 or the memory 254 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 250 through the TEE 290 and the processor 252.

Figure 3:
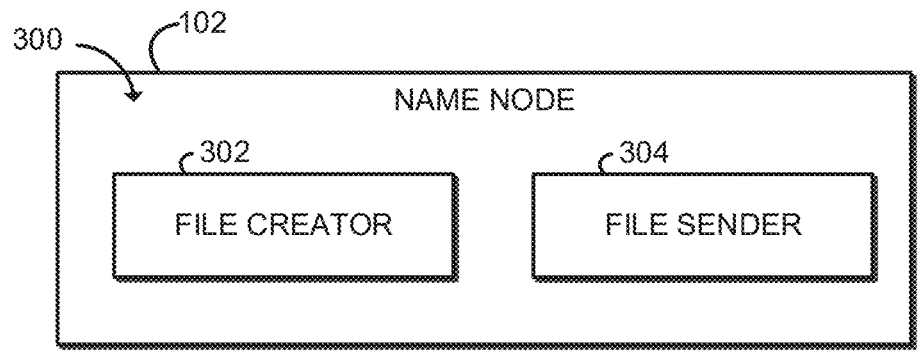
FIG. 3 is a simplified block diagram of at least one embodiment of an environment that may be established by a name node of FIG. 1.

Referring now to FIG. 3, in an illustrative embodiment, the name node 102 establishes an environment 300 during operation. The illustrative environment 300 includes a file creator 302 and a file sender 304. The various modules of the environment 300 may be embodied as hardware, software, firmware, or a combination thereof. For example, the various modules, logic, and other components of the environment 300 may form a portion of, or otherwise be established by, the processor 204 or other hardware components of the name node 102 such as the memory 206, the data storage 210, etc. As such, in some embodiments, one or more of the modules of the environment 300 may be embodied as circuitry or collection of electrical devices (e.g., file creator circuitry 302, file sender circuitry 304, etc.). In some embodiments, some or all of the modules of the environment 300 may be embodied as, e.g., a field programmable gate array (FPGA), an application specific integrated circuit (ASIC), an accelerator device, and/or the like. It should be appreciated that, in some embodiments, one or more of the circuits (e.g., the file creator circuitry 402, the file sender circuitry 404, etc.) may form a portion of one or more of the processor 204, the memory 206, the I/O subsystem 208, the data storage 210, and/or other components of the name node 102. For example, in some embodiments, some or all of the modules may be embodied as the processor 204 as well as the memory 206 and/or data storage 210 storing instructions to be executed by the processor 204. Additionally, in some embodiments, one or more of the illustrative modules may form a portion of another module and/or one or more of the illustrative modules may be independent of one another. Further, in some embodiments, one or more of the modules of the environment 300 may be embodied as virtualized hardware components or emulated architecture, which may be established and maintained by the processor 204 or other components of the name node 102. It should be appreciated that some of the functionality of one or more of the modules of the environment 300 may require a hardware implementation, in which case embodiments of modules which implement such functionality will be embodied at least partially as hardware.

The file creator 302, which may be embodied as hardware, firmware, software, virtualized hardware, emulated architecture, and/or a combination thereof as discussed above, is configured to create files for distributed file system (DFS). In the illustrative embodiment, the DFS is a Hadoop Distributed File System (HDFS). In other embodiments, the DFS may be a different type of DFS, such as Ceph, Pangu, etc. As part of creating a file, the file creator 302 determines an object size used by the DFS. When a file is split up and distributed to the data nodes 104, the object size indicates the size of each object send to the data nodes 104. The file creator 104 may determine the object size in any suitable manner, such as querying another compute device, accessing an object size stored in the memory 206 or the data storage 210, etc. In the illustrative embodiment, the object size is 128 megabytes. In other embodiments, the object size may be higher or lower, such as any size from 1 megabyte to 128 gigabytes.

Figure 5:
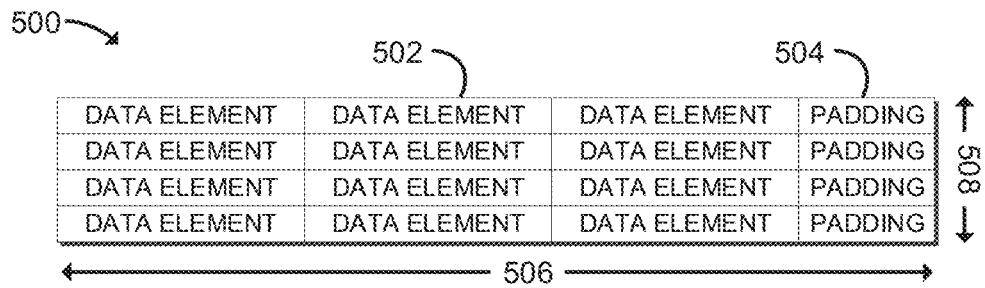
FIG. 5 is a simplified block diagram of at least one embodiment of a file with padding between objects.

The file creator 302 combines data elements to be stored in a file of the DFS. The data elements may be any suitable type of data element, such as plain text, documents, images, data files, etc. The file creator 302 may create a file formatted as shown in FIG. 5. The file 500 includes several data elements 502 with some padding 504. In the example shown in FIG. 5, the data length 506 represents the object size, and the data height 508 represents the number of objects the file will be broken into. It should be appreciated that the file may not be split up into objects as it is created, and the formatting shown in FIG. 5 as having a new "row" for each object is merely for the purpose of presentation and may not correspond to the physical structure of the file as it is created.

In creating the file, the file creator 302 may check the size of the next data element to be added to the file and, if the next element would span a boundary between the current object and the next object, the file creator 302 may add padding 504 up to the next object before adding the data element. As such, each data element will not be split across a boundary between objects. In embodiments in which data elements are different sizes, the file creator 302 may perform some optimization to order data elements in such a way that the amount of padding is reduced, minimized, or eliminated. In some embodiments, the file creator 302 may add padding at a location other than at the end of an object, such as at the beginning of the object or between data elements in the same object.

Figure 6:
FIG. 6 is a simplified block diagram of at least one embodiment of an object of a file with padding between objects.

The file sender 304, which may be embodied as hardware, firmware, software, virtualized hardware, emulated architecture, and/or a combination thereof as discussed above, is configured to send a file (such as a file created by the file creator 302) to data nodes 104 for storage. To do so, the file sender 304 splits the file into several objects based on the object size of the DFS. Each object may have the format of an object 600 shown in FIG. 6, with one or more data elements 602 and some padding 604. In some embodiments, the name node 102 may send the file to another compute device that splits the file into several objects.

After the file is split into objects, the file sender 304 sends the objects to the data nodes 104. The data nodes 104 that the file sender 304 is sending the objects to may be selected in any suitable manner, such as being assigned by an orchestrator, based on storage availability of the data nodes 104, based on a proximity to the data nodes 104, based on bandwidth availability to the data nodes 104, etc. In some embodiments, the file sender 304 may send the file or the objects to one or more intermediate compute devices determines which object should be stored at which data node 104. It should be appreciated that the system 100 stores a record of which data node 104 stores which object, such as by storing a record at the name node 102 or at some other compute device.

Figure 4:
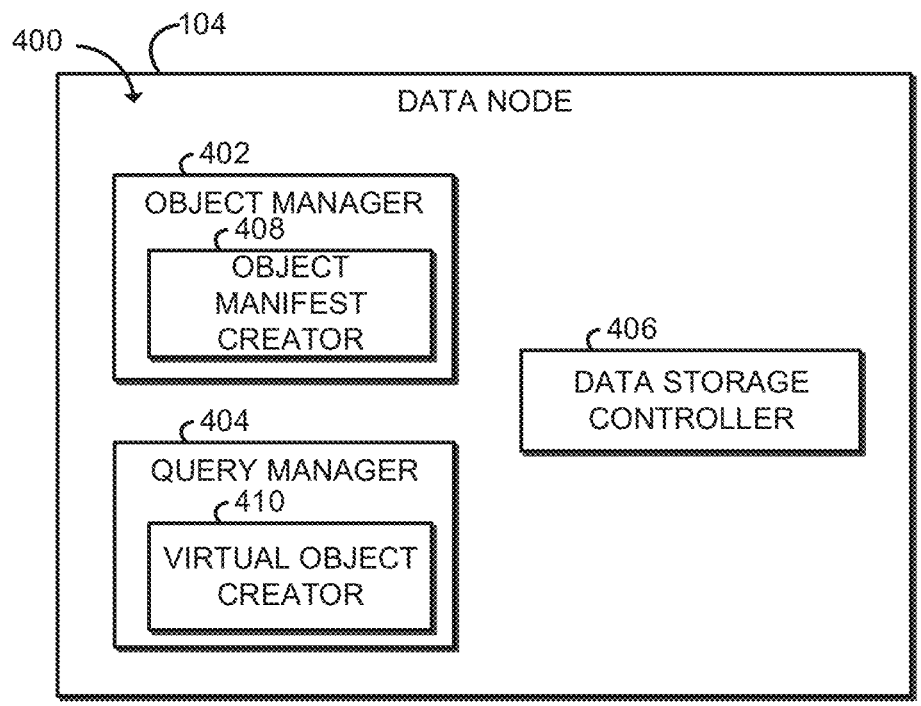
FIG. 4 is a simplified block diagram of at least one embodiment of an environment that may be established by a data node of FIG. 1.

Referring now to FIG. 4, in an illustrative embodiment, the data node 104 establishes an environment 400 during operation. The illustrative environment 400 includes an object manager 402, a query manager 404, and a data storage controller 406. The various modules of the environment 400 may be embodied as hardware, software, firmware, or a combination thereof. For example, the various modules, logic, and other components of the environment 400 may form a portion of, or otherwise be established by, the processor 204 or other hardware components of the data node 104 such as the memory 206, the data storage 210, etc. However, it should be understood that, unless explicitly stated otherwise, embodiments of the data storage controller 406 are embodied as part of a data storage device 210. As such, in some embodiments, one or more of the modules of the environment 400 may be embodied as circuitry or collection of electrical devices (e.g., object manager circuitry 402, query manager circuitry 404, and data storage controller circuitry 406, etc.). In some embodiments, some or all of the modules of the environment 400 may be embodied as, e.g., a field programmable gate array (FPGA), an application specific integrated circuit (ASIC), an accelerator device, and/or the like. It should be appreciated that, in some embodiments, one or more of the circuits (e.g., the object manager circuitry 402, the query manager circuitry 404, and the data storage controller circuitry 406, etc.) may form a portion of one or more of the processor 204, the memory 206, the I/O subsystem 208, the data storage 210, and/or other components of the data node 104. For example, in some embodiments, some or all of the modules may be embodied as the processor 204 as well as the memory 206 and/or data storage 210 storing instructions to be executed by the processor 204. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the processor 204 or other components of the data node 104. It should be appreciated that some of the functionality of one or more of the modules of the environment 400 may require a hardware implementation, in which case embodiments of modules which implement such functionality will be embodied at least partially as hardware.

The object manager 402, which may be embodied as hardware, firmware, software, virtualized hardware, emulated architecture, and/or a combination thereof as discussed above, is configured to receive and manage objects from a name node 102 or other compute devices. The object manager 402 can receives one or more objects of a file of a distributed file system (DFS) from a name node 102, such as when the file creator 302 creates a file and the file sender 304 sends an object of the file to the data node 104. The object manager 402 may determine the data elements that are present in the object. The object manager 402 may determine which elements are present in the object in any suitable manner, such as by examining the object, accessing metadata in the object, receiving metadata from the name node 102 other than in the object, etc.

The object manager 402 includes an object manifest creator 408. The object manifest creator 408 may prepare a manifest to store with the data object. The manifest indicates the data elements present in the object as well as their locations in the object. For example, the manifest may be embodied as a list of data elements with an offset relative to the start of the data object indicating the beginning of the data element in the object. In some embodiments, the manifest may be stored separately from the object.

Figure 7:
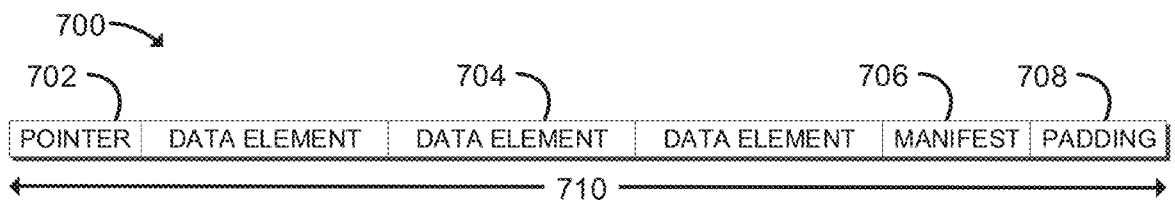
FIG. 7 is a simplified block diagram of at least one embodiment of an object of a file with a manifest.

The object manager 402 may stores the manifest and the object as a local file in a local file system on the data storage device 210. In the illustrative embodiment, the object manager 402 includes a pointer at the beginning of the local file that indicates a position of the manifest in the local file. In the illustrative embodiment, the object manager 402 saves a local file formatted as shown in FIG. 7, with a pointer 702 indicating the location of the manifest 706, which indicates in turn the location of each data element 704. In some embodiments, the local file may include padding 708, such as at the end of the local file. The pointer 702 may be any suitable size, such as 4 kilobytes.

The query manager 404, which may be embodied as hardware, firmware, software, virtualized hardware, emulated architecture, and/or a combination thereof as discussed above, is configured to manage queries of objects. The query manager 404 may receive an instruction to query an object stored in the DFS. The query may be any query or command that is suitable for the data elements stored in the object, such as a search, a data check, data processing, etc. For example, the query may be a search string, a data integrity check, a word count, image classification, etc. In the illustrative embodiment, the query is to be made in regard to each data element in the object. Additionally or alternatively, in some embodiments, a query may be made for a subset of the data elements in the object.

The query manager 404 may access the manifest of the object on the data storage device 210 to determine the data elements in the object. In the illustrative embodiment, the query manager 404 accesses a pointer at the beginning of the object that indicates the location of the manifest, then the data node 104 accesses the manifest at that location. The manifest indicates the data elements present in the object as well as their locations in the object.

The query manager 404 accesses block mapping for each data element of the object on the data storage device 210. Each data element may be located in one block or in several consecutive or non-consecutive blocks of the data storage device 210. In some embodiments, some or all of the objects may begin at an offset from the beginning of a data block.

The query manager 404 may create a virtual object for each data element of the object based on the block mapping. Each virtual object may indicate the data block or blocks that the data element is present in as well as one or more offset values indicating where on the corresponding data block the data element is located. In the illustrative embodiment, virtual objects are considered transient and are created or updated for each query received. For example, the data storage device 210 may remap a location of an object to different blocks, rendering a virtual object outdated. Additionally or alternatively, in some embodiments, the virtual objects may be created or maintained prior to receipt of the query.

After creating the virtual objects, the query manager 404 may instruct the data storage controller 406 to query the data elements of the object based on the virtual objects. To do so, in the illustrative embodiment, the query manager 404 creates a compute descriptor for each data element. Each illustrative compute descriptor includes the virtual object along with information detailing the computation to be performed, such as input, output, operation, and arguments. In the illustrative embodiment, the query manager 404 sends a non-volatile memory express (NVMe) pass-through command to the data storage controller 406 to perform the query.

In some embodiments, the query manager 404 may not create the virtual objects. Rather, the query manager 404 may instruct the data storage controller 406 to perform a particular query to all data elements in an object. The data storage controller 406 may then access the manifest to determine which data elements and present and where they are. The data storage controller 406 may then determine the data block mapping as discussed above, with or without the creation of the virtual objects.

After the data storage controller 406 has completed the query, the query manager 404 may receive a result. In the illustrative embodiment, the data storage controller 406 sends an NVMe command to the data storage controller 406 to harvest the result of the query. Additionally or alternatively, in some embodiments, the data storage controller 406 may send the result to another component of the data node 104 automatically upon completion of the query The data storage controller 406, which may be embodied as hardware, firmware, software, virtualized hardware, emulated architecture, and/or a combination thereof as discussed above, is configured to perform queries received from the query manager 404 on the data elements. In the illustrative embodiment, the data storage controller 406 receives a compute descriptor that includes a virtual object and a description of the computation task, as described above. Alternatively, the data storage controller 406 may receive an indication of the object to be queried and may parse the manifest of the object itself.

To perform the query, the data storage controller 406 may load a data element into the local memory 222 and/or accelerator 224 and then perform the query on the data element using the processor 220 and/or the accelerator 224. It should be appreciated that the data element being queried does not need to be sent outside of the data storage device 210 in order to perform the query, such as over the I/O subsystem 208 or the communication circuitry 212. In particular, it should be appreciated that each data element of the entire file created by the name node 102 that is stored in several different data nodes 204 can be queried without any of the data elements being sent over any interconnect or network (other than any interconnect internal to a data storage device 210). After performing the query, the data storage controller 406 may then returns the result of the query to the query manager 404.

In the illustrative embodiment, the data storage controller 406 is part of a local data storage device 210. In other embodiments, the data storage controller 406 may be part of a remote data storage device 210, such as a data storage device 210 of a SAN. In such embodiments, the data storage controller 406 may be embodied as or include a host bus adapter (HBA) that communicates with a network or fabric.

Figure 8:
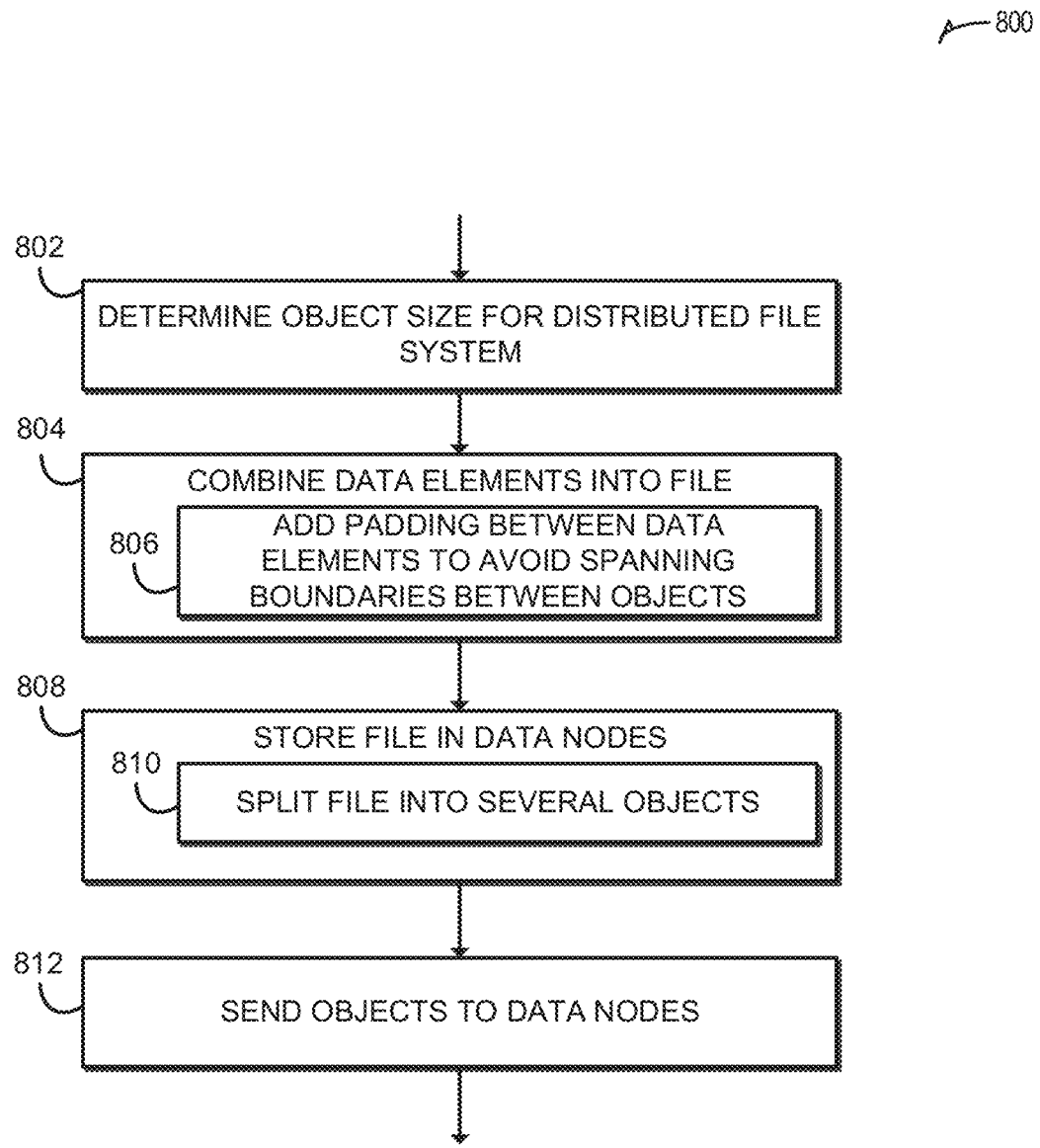
FIG. 8 is a simplified flow diagram of at least one embodiment of a method for storing a distributed file that may be executed by a name node of FIG. 1.

Referring now to FIG. 8, in use, a name node 102 may execute a method 800 for storing a file in a distributed file system (DFS). The method 800 begins in block 802, in which the name node 102 determines an object size for the DFS. In the illustrative embodiment, the DFS is a Hadoop Distributed File System (HDFS). In other embodiments, the DFS may be a different type of DF S, such as Ceph, Pangu, etc. The name node 102 may determine the object size in any suitable manner, such as querying another compute device, accessing an object size stored in the memory 206 or the data storage 210, etc. In the illustrative embodiment, the object size is 128 megabytes. In other embodiments, the object size may be higher or lower, such as any size from 1 megabyte to 128 gigabytes.

In block 804, the name node 102 combines data elements to be stored in a file of the DFS. The data elements may be any suitable type of data element, such as plain text, documents, images, data files, etc. The name node 102 may add padding between data elements in order to avoid spanning the boundaries between objects. In the illustrative embodiment, the name node 102 may check the size of the next data element to be added to the file and, if the next element would span a boundary between the current object and the next object, the name node 102 may add padding up to the next object before adding the data element. In embodiments in which data elements are different sizes, the name node 102 may perform some optimization to order data elements in such a way that the amount of padding is reduced, minimized, or eliminated. In some embodiments, the name node 102 may add padding at a location other than at the end of an object, such as at the beginning of the object or between data elements in the same object. It should be appreciated that, the file may not be split up into objects as the name node 102 is adding the data elements to the file. Rather, the name node 102 may add data elements and padding to the file based on how the file is expected to be broken up into objects in the future. The file with padding may be formatted as shown in FIG. 5, with each object containing one or more data elements 502 with padding 504 present to avoid a data element 502 spanning a boundary of an object.

In block 808, the name node 102 stores the file in data nodes 104. The name node 810 splits the file into several objects based on the determined object size in block 810. Each object may have the format shown in FIG. 6, with one or more data elements 602 and some padding 604. In some embodiments, the name node 102 may send the file to another compute device that splits the file into several objects.

In block 812, the name node 102 sends the objects to the data nodes 104. The data nodes 104 that the name node 102 is sending the objects to may be selected in any suitable manner, such as being assigned by an orchestrator, based on storage availability of the data nodes 104, based on a proximity to the data nodes 104, based on bandwidth availability to the data nodes 104, etc. In some embodiments, the name node 102 may send the file or the objects to one or more intermediate compute devices determines which object should be stored at which data node 104. It should be appreciated that the system 100 stores a record of which data node 104 stores which object, such as by storing a record at the name node 102 or at some other compute device.

Figure 9:
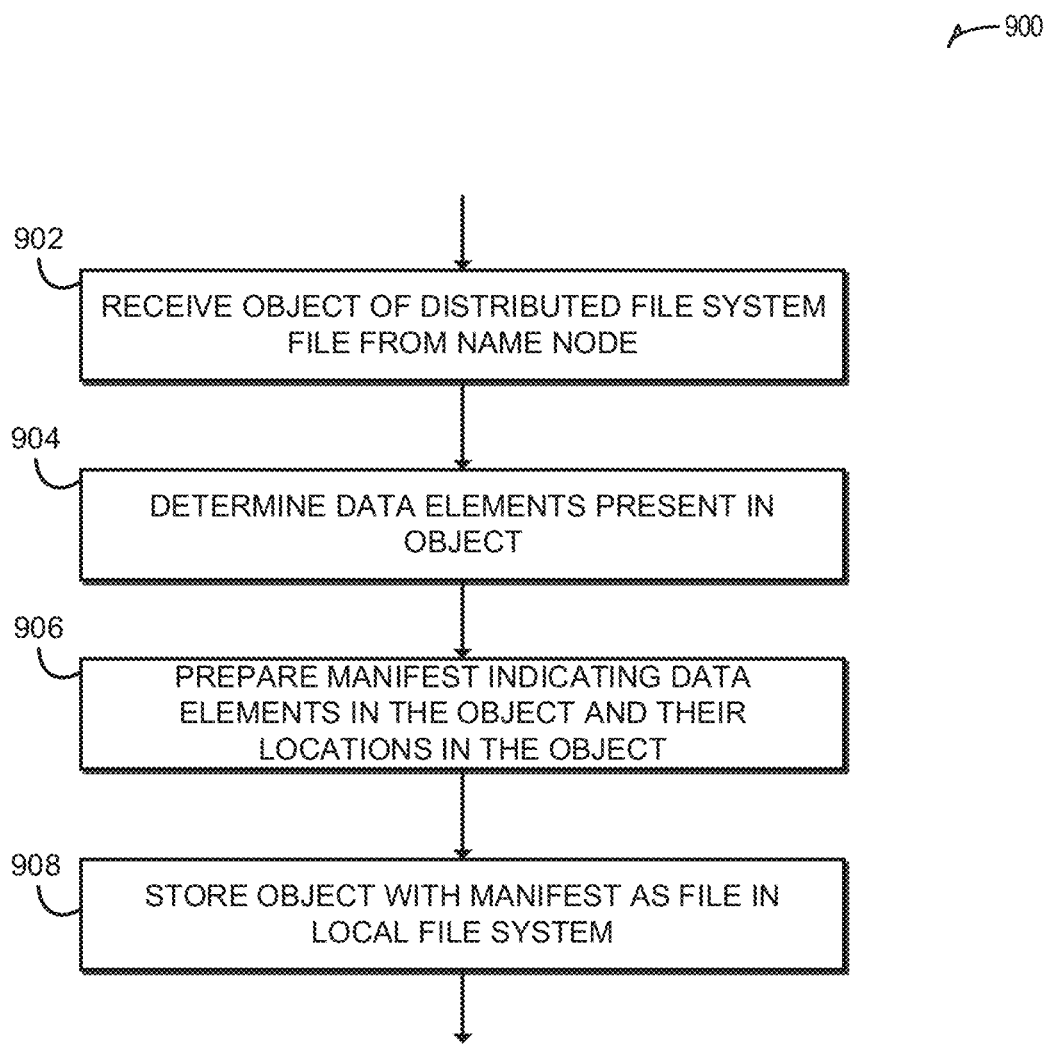
FIG. 9 is a simplified flow diagram of at least one embodiment of a method for storing a distributed file that may be executed by a data node of FIG. 1.

Referring now to FIG. 9, in use, a data node 104 may execute a method 900 for storing a file in a distributed file system (DFS). The method 900 begins in block 902, in which the data node 104 receives one or more objects of a file of a distributed file system (DFS) from a name node 102, such as when the name node 102 executes the method 800 described above.

In block 904, the data node 104 determines the data elements that are present in the object. The data node 104 may determine which elements are present in the object in any suitable manner, such as by examining the object, accessing metadata in the object, receiving metadata from the name node 102 other than in the object, etc.

In block 906, the data node 104 prepares a manifest to store with the data object. The manifest indicates the data elements present in the object as well as their locations in the object. For example, the manifest may be embodied as a list of data elements with an offset relative to the start of the data object indicating the beginning of the data element in the object. In some embodiments, the manifest may be stored separately from the object.

In block 908, the data node 104 stores the manifest and the object as a local file in a local file system on the data storage device 210. In the illustrative embodiment, the data node 104 includes a pointer at the beginning of the local file that indicates a position of the manifest in the local file. In the illustrative embodiment, the data node 104 saves a local file formatted as shown in FIG. 7, with a pointer 702 indicating the location of the manifest 706, which indicates in turn the location of each data element 704. In some embodiments, the local file may include padding 708, such as at the end of the local file.

Figure 10:
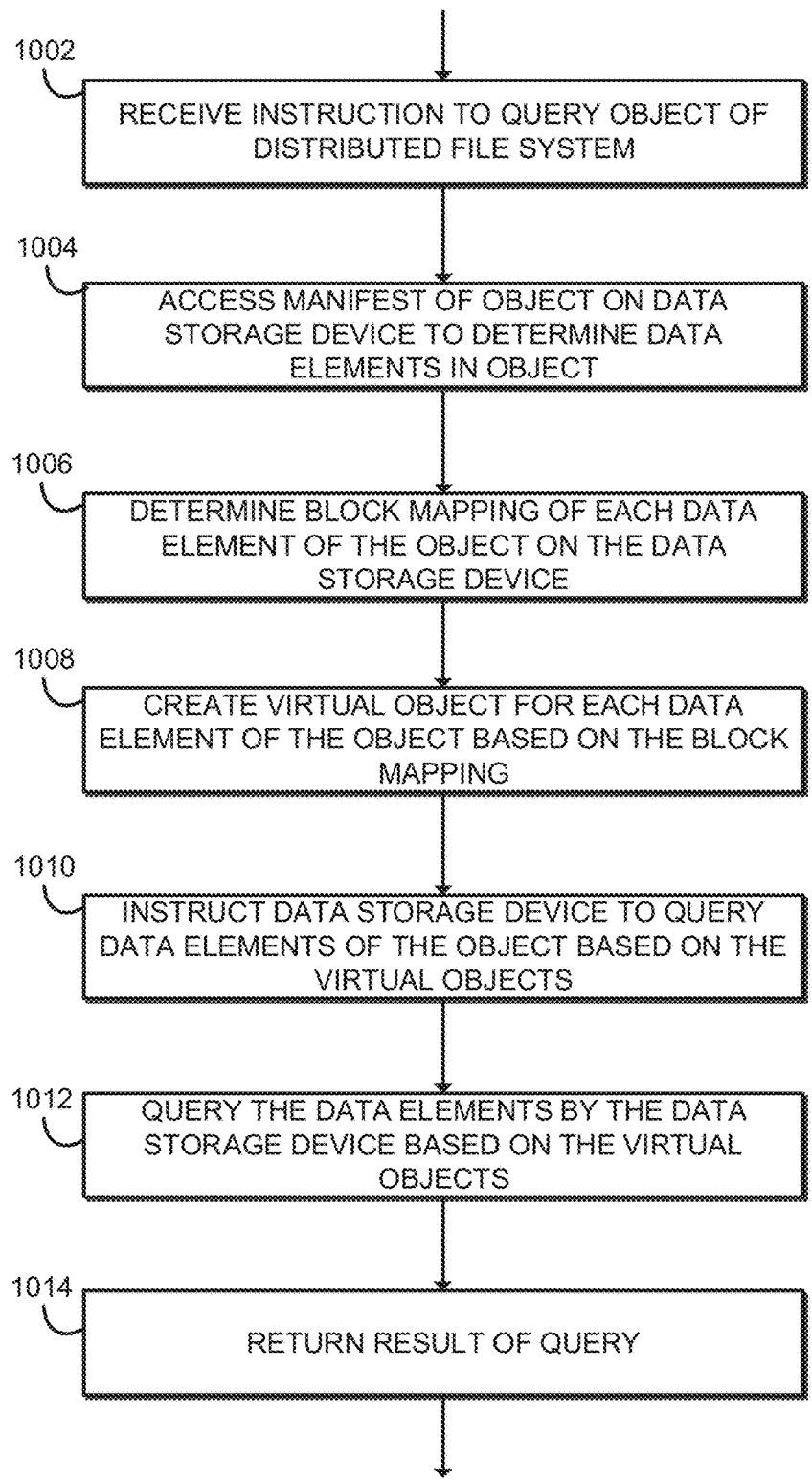
FIG. 10 is a simplified flow diagram of at least one embodiment of a method for processing a distributed file that may be executed by a data node of FIG. 1.

Referring now to FIG. 10, in use, a data node 104 may execute a method 1000 for processing an object of a file in a distributed file system (DFS). The method 1000 begins in block 1002, in which the data node 104 receives an instruction to query an object stored in the DFS. The query may be any query or command that is suitable for the data elements stored in the object, such as a search, a data check, data processing, etc. For example, the query may be a search string, a data integrity check, a word count, image classification, etc. In the illustrative embodiment, the query is to be made in regard to each data element in the object. Additionally or alternatively, in some embodiments, a query may be made for a subset of the data elements in the object.

In block 1004, the data node 104 accesses the manifest of the object on the data storage device 210 to determine the data elements in the object. In the illustrative embodiment, the data node 104 accesses a pointer at the beginning of the object that indicates the location of the manifest, then the data node 104 accesses the manifest at that location. The manifest indicates the data elements present in the object as well as their locations in the object.

In block 1006, the data node 104 accesses block mapping for each data element of the object on the data storage device 210. Each data element may be located in one block or in several consecutive or non-consecutive blocks of the data storage device 210. In some embodiments, some or all of the objects may begin at an offset from the beginning of a data block.

In block 1008, the data node 104 creates a virtual object for each data element of the object based on the block mapping. Each virtual object may indicate the data block or blocks that the data element is present in as well as one or more offset values indicating where on the corresponding data block the data element is located. In the illustrative embodiment, virtual objects are considered transient and are created or updated for each query received. For example, the data storage device 210 may remap a location of an object to different blocks, rendering a virtual object outdated. Additionally or alternatively, in some embodiments, the virtual objects may be created or maintained prior to receipt of the query.

In block 1010, the data node 104 instructs the data storage device 210 to query the data elements of the object based on the virtual objects. To do so, in the illustrative embodiment, the data node 104 creates a compute descriptor for each data element. Each illustrative compute descriptor includes the virtual object along with information detailing the computation to be performed. In the illustrative embodiment, the data node 104 sends an NVMe pass-through command to the data storage device 210 to perform the query. In some embodiments, the data storage device 210 may be remote, in which case the data node 104 may send a command to the data storage device 210 over a network or fabric.

In some embodiments, the data node 104 may not create the virtual objects. Rather, the data node 104 may instruct the data storage device 210 to perform a particular query to all data elements in an object. The data storage device 210 may then access the manifest to determine which data elements and present and where they are. The data storage device 210 may then determine the data block mapping as discussed above, with or without the creation of the virtual objects.

In block 1012, the data storage device 210 performs the query on the data elements. To do so, the data storage device may load a data element into the local memory 222 and/or accelerator 224 and then perform the query on the data element using the processor 220 and/or the accelerator 224. It should be appreciated that the data element being queried does not need to be sent outside of the data storage device 210 in order to perform the query, such as over the I/O subsystem 209 or the communication circuitry 212. In particular, it should be appreciated that each data element of the entire file created by the name node 102 that is stored in several different data nodes 204 can be queried without any of the data elements being sent over any interconnect or network (other than any interconnect internal to a data storage device 210).

In block 1014, the data storage device 210 returns the result of the query to the data node 104, which may then return the result to the compute device that initiate the query. In the illustrative embodiment, the data node 104 sends an NVMe command to the data storage device 210 to harvest the result of the query. Additionally or alternatively, in some embodiments, the data storage device 210 may send the result to another component of the data node 104 automatically upon completion of the query. The query result may be embodied as an identifier of data element that matched the query, an indicator of whether a data element matched a query, a result of a data integrity check, a result of a neural network, a result of an image classification, a result of a computation, etc.

Example Computing Embodiments

The following sections present various examples of computing devices, systems, architectures, and environments that may be used in conjunction with the DFS storage and query processing functionality described throughout this disclosure.

Example Edge Computing Embodiments

Figure 11:
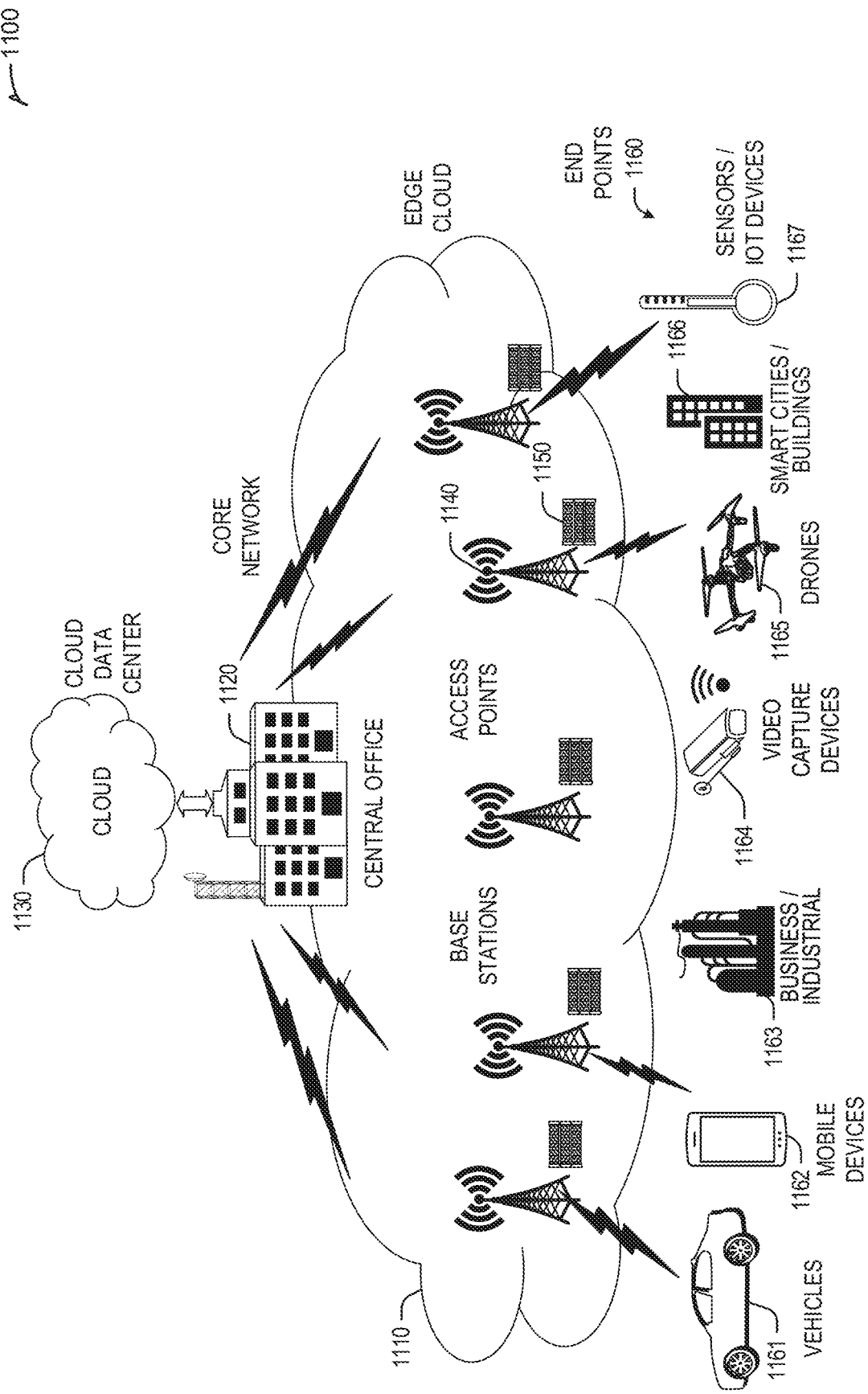
FIG. 11 illustrates an overview of an edge cloud configuration for edge computing.

FIG. 11 is a block diagram 1100 showing an overview of a configuration for edge computing, which includes a layer of processing referred to in many of the following examples as an "edge cloud". As shown, the edge cloud 1110 is co-located at an edge location, such as an access point or base station 1140, a local processing hub 1150, or a central office 1120, and thus may include multiple entities, devices, and equipment instances. The edge cloud 1110 is located much closer to the endpoint (consumer and producer) data sources 1160 (e.g., autonomous vehicles 1161, user equipment 1162, business and industrial equipment 1163, video capture devices 1164, drones 1165, smart cities and building devices 1166, sensors and IoT devices 1167, etc.) than the cloud data center 1130. Compute, memory, and storage resources which are offered at the edges in the edge cloud 1110 are critical to providing ultra-low latency response times for services and functions used by the endpoint data sources 1160 as well as reduce network backhaul traffic from the edge cloud 1110 toward cloud data center 1130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 12:
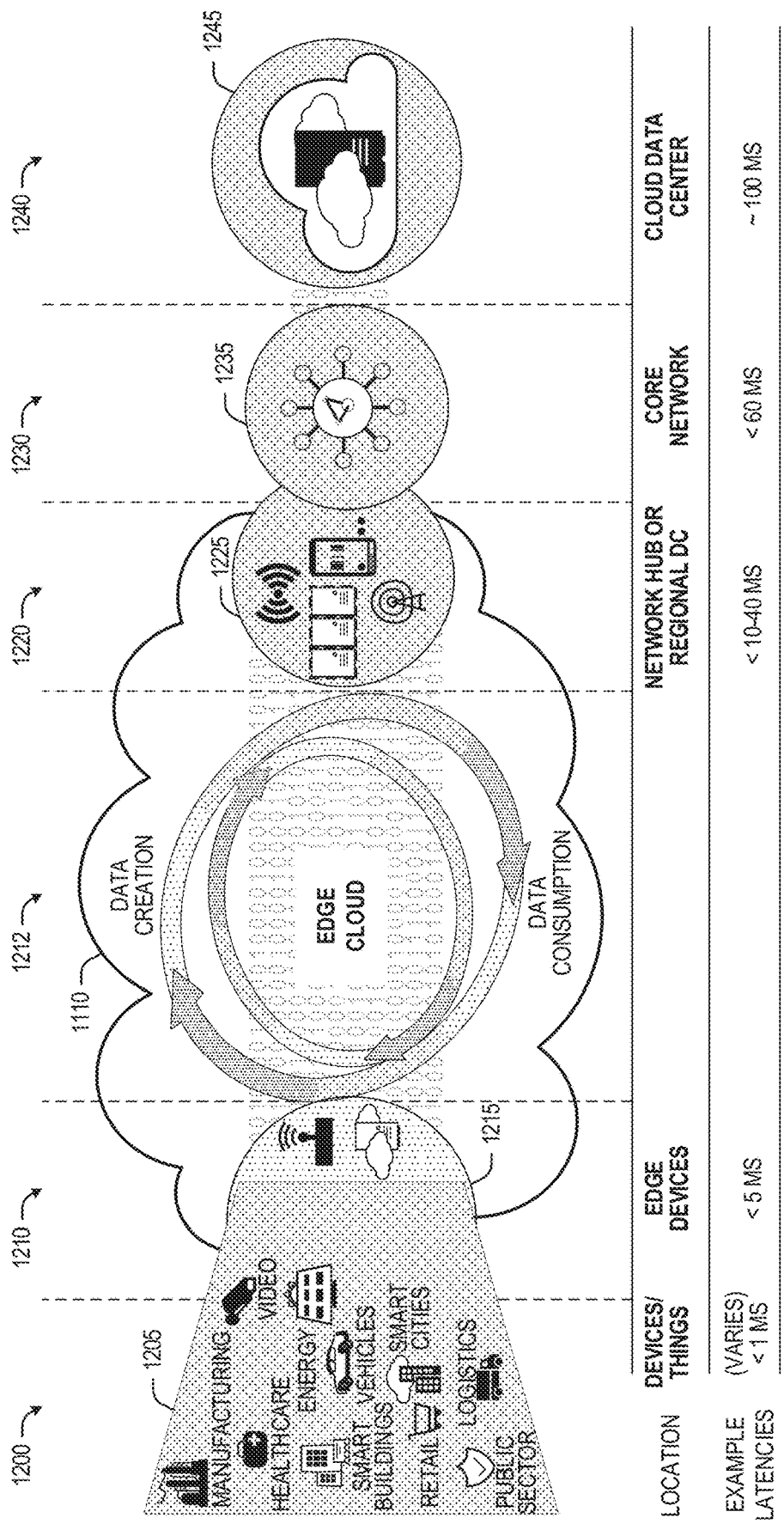
FIG. 12 illustrates operational layers among endpoints, an edge cloud, and cloud computing environments.

FIG. 12 illustrates operational layers among endpoints, an edge cloud, and cloud computing environments. Specifically, FIG. 12 depicts examples of computational use cases 1205, utilizing the edge cloud 1110 among multiple illustrative layers of network computing. The layers begin at an endpoint (devices and things) layer 1200, which accesses the edge cloud 1110 to conduct data creation, analysis, and data consumption activities. The edge cloud 1110 may span multiple network layers, such as an edge devices layer 1210 having gateways, on-premise servers, or network equipment (nodes 1215) located in physically proximate edge systems; a network access layer 1220, encompassing base stations, radio processing units, network hubs, regional data centers (DC), or local network equipment (equipment 1225); and any equipment, devices, or nodes located therebetween (in layer 1212, not illustrated in detail). The network communications within the edge cloud 1110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1200, under 5 ms at the edge devices layer 1210, to even between 10 to 40 ms when communicating with nodes at the network access layer 1220. Beyond the edge cloud 1110 are core network 1230 and cloud data center 1240 layers, each with increasing latency (e.g., between 50-60 ms at the core network layer 1230, to 100 or more ms at the cloud data center layer). As a result, operations at a core network data center 1235 or a cloud data center 1245, with latencies of at least 50 to 100 ms or more, will not be able to accomplish many time-critical functions of the use cases 1205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1235 or a cloud data center 1245, a central office or content data network may be considered as being located within a "near edge" layer ("near" to the cloud, having high latency values when communicating with the devices and endpoints of the use cases 1205), whereas an access point, base station, on-premise server, or network gateway may be considered as located within a "far edge" layer ("far" from the cloud, having low latency values when communicating with the devices and endpoints of the use cases 1205). It will be understood that other categorizations of a particular network layer as constituting a "close", "local", "near", "middle", or "far" edge may be based on latency, distance, number of network hops, or other measurable characteristics, as measured from a source in any of the network layers 1200-1240.

The various use cases 1205 may access resources under usage pressure from incoming streams, due to multiple services utilizing the edge cloud. To achieve results with low latency, the services executed within the edge cloud 1110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 1110 may provide the ability to serve and respond to multiple applications of the use cases 1205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 1110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 1110 (network layers 1200-1240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internetof-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 1110.

As such, the edge cloud 1110 is formed from network components and functional features operated by and within edge gateway nodes, edge aggregation nodes, or other edge compute nodes among network layers 1210-1230. The edge cloud 1110 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 1110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 1110 may be servers, multi-tenant servers, appliance computing devices, and/or any other type of computing devices. For example, the edge cloud 1110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 2B. The edge cloud 1110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 13:
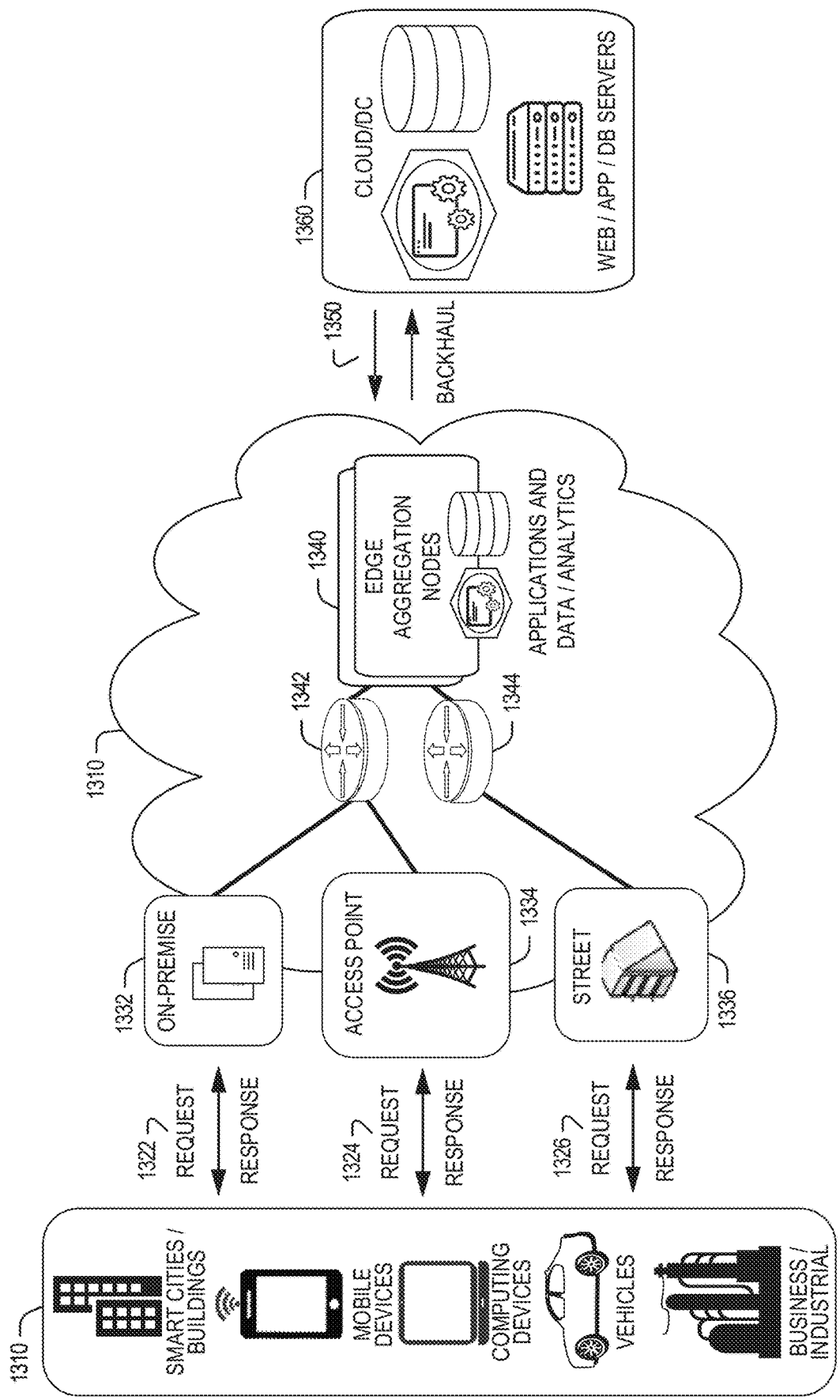
FIG. 13 illustrates an example approach for networking and services in an edge computing system.

In FIG. 13, various client endpoints 1310 (in the form of mobile devices, computers, autonomous vehicles, business computing equipment, industrial processing equipment) exchange requests and responses that are specific to the type of endpoint network aggregation. For instance, client endpoints 1310 may obtain network access via a wired broadband network, by exchanging requests and responses 1322 through an on-premise network system 1332. Some client endpoints 1310, such as mobile computing devices, may obtain network access via a wireless broadband network, by exchanging requests and responses 1324 through an access point (e.g., cellular network tower) 1334. Some client endpoints 1310, such as autonomous vehicles may obtain network access for requests and responses 1326 via a wireless vehicular network through a street-located network system 1336. However, regardless of the type of network access, the TSP may deploy aggregation points 1342, 1344 within the edge cloud 1110 to aggregate traffic and requests. Thus, within the edge cloud 1110, the TSP may deploy various compute and storage resources, such as at edge aggregation nodes 1340, to provide requested content. The edge aggregation nodes 1340 and other systems of the edge cloud 1110 are connected to a cloud or data center 1360, which uses a backhaul network 1350 to fulfill higher-latency requests from a cloud/data center for websites, applications, database servers, etc. Additional or consolidated instances of the edge aggregation nodes 1340 and the aggregation points 1342, 1344, including those deployed on a single server framework, may also be present within the edge cloud 1110 or other areas of the TSP infrastructure.

Figure 14:
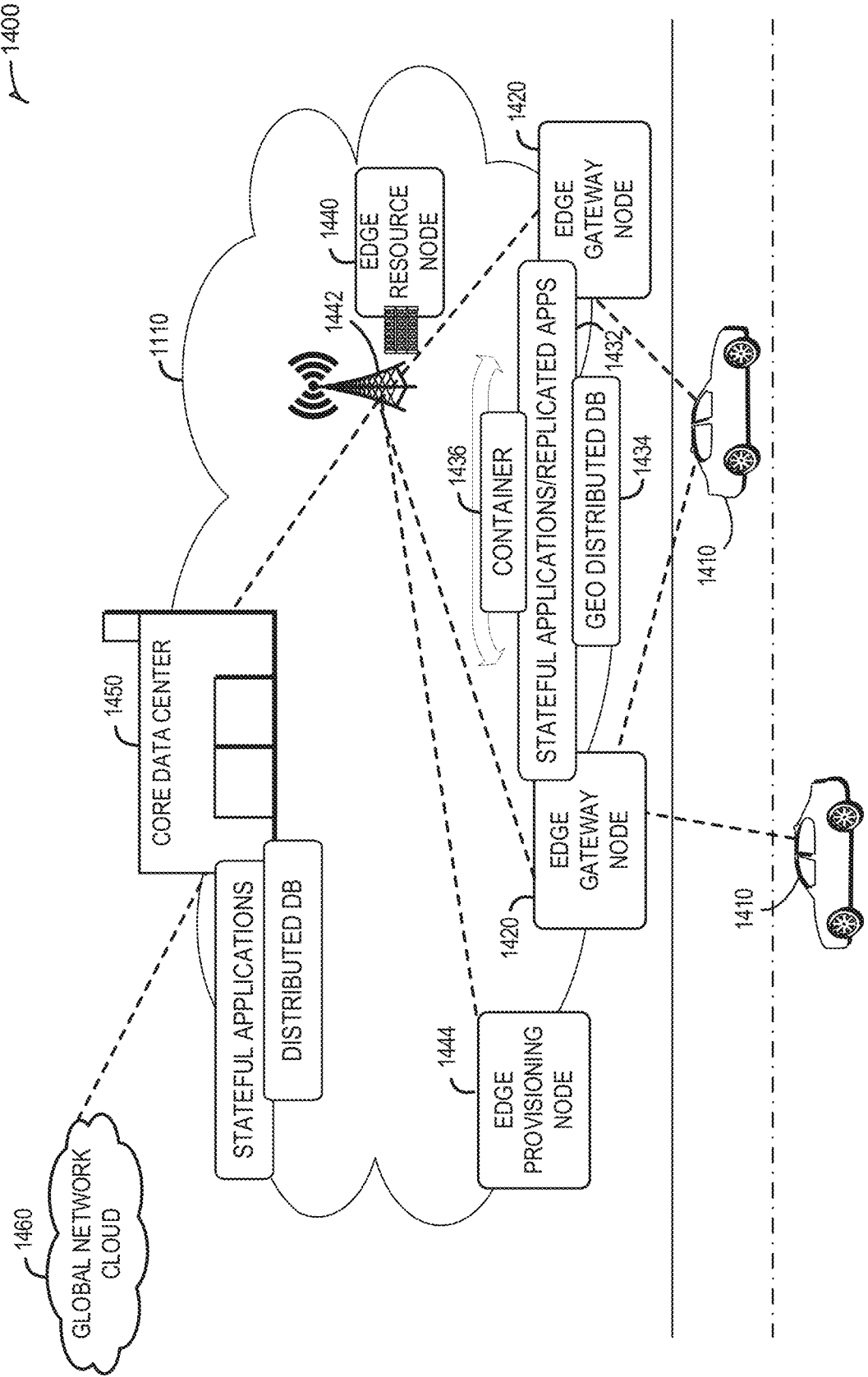
FIG. 14 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 14 shows a simplified vehicle compute and communication use case involving mobile access to applications in an edge computing system 1400 that implements an edge cloud 1110. In this use case, respective client compute nodes 1410 may be embodied as in-vehicle compute systems (e.g., in-vehicle navigation and/or infotainment systems) located in corresponding vehicles which communicate with the edge gateway nodes 1420 during traversal of a roadway. For instance, the edge gateway nodes 1420 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client compute node 1410 and a particular edge gateway device 1420 may propagate so as to maintain a consistent connection and context for the client compute node 1410. Likewise, mobile edge nodes may aggregate at the high priority services or according to the throughput or latency resolution requirements for the underlying service(s) (e.g., in the case of drones). The respective edge gateway devices 1420 include an amount of processing and storage capabilities and, as such, some processing and/or storage of data for the client compute nodes 1410 may be performed on one or more of the edge gateway devices 1420.

The edge gateway devices 1420 may communicate with one or more edge resource nodes 1440, which are illustratively embodied as compute servers, appliances or components located at or in a communication base station 1442 (e.g., a base station of a cellular network). As discussed above, the respective edge resource nodes 1440 include an amount of processing and storage capabilities and, as such, some processing and/or storage of data for the client compute nodes 1410 may be performed on the edge resource node 1440. For example, the processing of data that is less urgent or important may be performed by the edge resource node 1440, while the processing of data that is of a higher urgency or importance may be performed by the edge gateway devices 1420 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 1440 also communicate with the core data center 1450, which may include compute servers, appliances, and/or other components located in a central location (e.g., a central office of a cellular communication network). The core data center 1450 may provide a gateway to the global network cloud 1460 (e.g., the Internet) for the edge cloud 1110 operations formed by the edge resource node(s) 1440 and the edge gateway devices 1420. Additionally, in some examples, the core data center 1450 may include an amount of processing and storage capabilities and, as such, some processing and/or storage of data for the client compute devices may be performed on the core data center 1450 (e.g., processing of low urgency or importance, or high complexity).

The edge gateway nodes 1420 or the edge resource nodes 1440 may offer the use of stateful applications 1432 and a geographic distributed database 1434. Although the applications 1432 and database 1434 are illustrated as being horizontally distributed at a layer of the edge cloud 1110, it will be understood that resources, services, or other components of the application may be vertically distributed throughout the edge cloud (including, part of the application executed at the client compute node 1410, other parts at the edge gateway nodes 1420 or the edge resource nodes 1440, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 1436 (or pod of containers) may be flexibly migrated from an edge node 1420 to other edge nodes (e.g., 1420, 640, etc.) such that the container with an application and workload does not need to be reconstituted, re-compiled, re-interpreted in order for migration to work. However, in such settings, there may be some remedial or "swizzling" translation operations applied. For example, the physical hardware at node 1440 may differ from edge gateway node 1420 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 14 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 1420, some others at the edge resource node 1440, and others in the core data center 1450 or global network cloud 1460.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 1400 can include or be in communication with an edge provisioning node 1444. The edge provisioning node 1444 can distribute software such as the example computer readable instructions 282 of FIG. 2B, to various receiving parties for implementing any of the methods described herein. The example edge provisioning node 1444 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 1444. For example, the entity that owns and/or operates the edge provisioning node 1444 may be a developer, a seller, and/or a licensor (or a customer and/or consumer thereof) of software instructions such as the example computer readable instructions 282 of FIG. 2B. The receiving parties may be consumers, service providers, users, retailers, OEMs, etc., who purchase and/or license the software instructions for use and/or re-sale and/or sub-licensing.

In an example, edge provisioning node 1444 includes one or more servers and one or more storage devices. The storage devices host computer readable instructions such as the example computer readable instructions 282 of FIG. 2B, as described below. Similarly to edge gateway devices 1420 described above, the one or more servers of the edge provisioning node 1444 are in communication with a base station 1442 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 282 from the edge provisioning node 1444. For example, the software instructions, which may correspond to the example computer readable instructions 282 of FIG. 2B, may be downloaded to the example processor platform/s, which is to execute the computer readable instructions 282 to implement the methods described herein.

In some examples, the processor platform(s) that execute the computer readable instructions 282 can be physically located in different geographic locations, legal jurisdictions, etc. In some examples, one or more servers of the edge provisioning node 1444 periodically offer, transmit, and/or force updates to the software instructions (e.g., the example computer readable instructions 282 of FIG. 2B) to ensure improvements, patches, updates, etc. are distributed and applied to the software instructions implemented at the end user devices. In some examples, different components of the computer readable instructions 282 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 15:
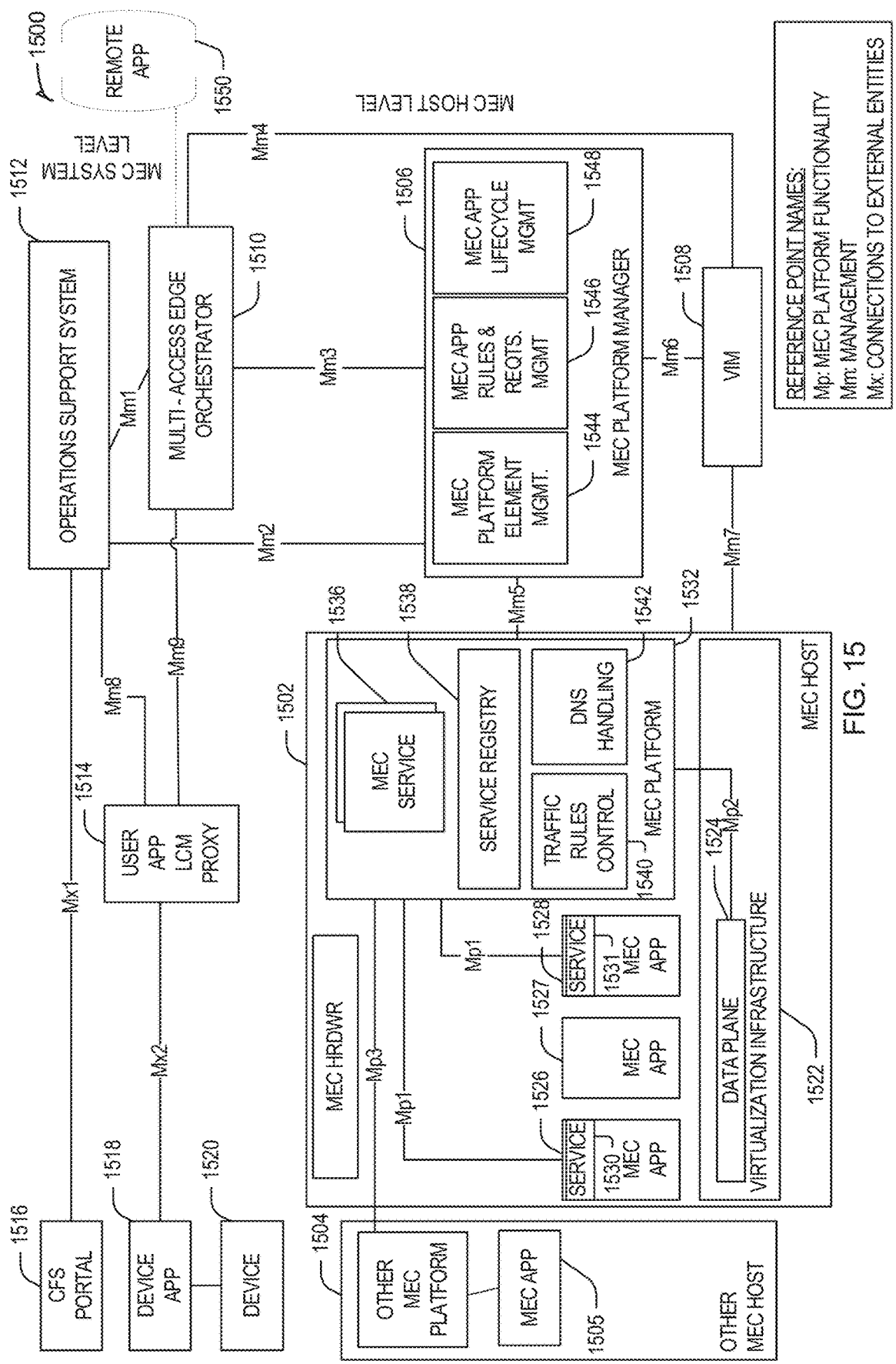
FIG. 15 illustrates an example mobile edge system reference architecture, arranged according to an ETSI Multi-Access Edge Computing (MEC) specification.

FIG. 15 illustrates a mobile edge system reference architecture (or MEC architecture) 1500, such as is indicated by ETSI MEC specifications. FIG. 15 specifically illustrates a MEC architecture 1500 with MEC hosts 1502 and 1504 providing functionalities in accordance with the ETSI GS MEC-003 specification. In some aspects, enhancements to the MEC platform 1532 and the MEC platform manager 1506 may be used for providing storing and processing files in a distributed file system, as described in more detail above.

Referring to FIG. 15, the MEC network architecture 1500 can include MEC hosts 1502 and 1504, a virtualization infrastructure manager (VIM) 1508, an MEC platform manager 1506, an MEC orchestrator 1510, an operations support system 1512, a user app proxy 1514, a UE app 1518 running on UE 1520, and CFS portal 1516. The MEC host 1502 can include a MEC platform 1532 with filtering rules control component 1540, a DNS handling component 1542, a service registry 1538, and MEC services 1536. The MEC services 1536 can include at least one scheduler, which can be used to select resources for instantiating MEC apps (or NFVs) 1526, 1527, and 1528 upon virtualization infrastructure 1522. The MEC apps 1526 and 1528 can be configured to provide services 1530 and 1531, which can include processing network communications traffic of different types associated with one or more wireless connections (e.g., connections to one or more RAN or telecom-core network entities). The MEC app 1505 instantiated within MEC host 1504 can be similar to the MEC apps 1526-7728 instantiated within MEC host 1502. The virtualization infrastructure 1522 includes a data plane 1524 coupled to the MEC platform via an MP2 interface. Additional interfaces between various network entities of the MEC architecture 1500 are illustrated in FIG. 15.

The MEC platform manager 1506 can include MEC platform element management component 1544, MEC app rules and requirements management component 1546, and MEC app lifecycle management component 1548. The various entities within the MEC architecture 1500 can perform functionalities as disclosed by the ETSI GS MEC-003 specification.

In some aspects, the remote application (or app) 1550 is configured to communicate with the MEC host 1502 (e.g., with the MEC apps 1526-7728) via the MEC orchestrator 1510 and the MEC platform manager 1506.

Figure 16:
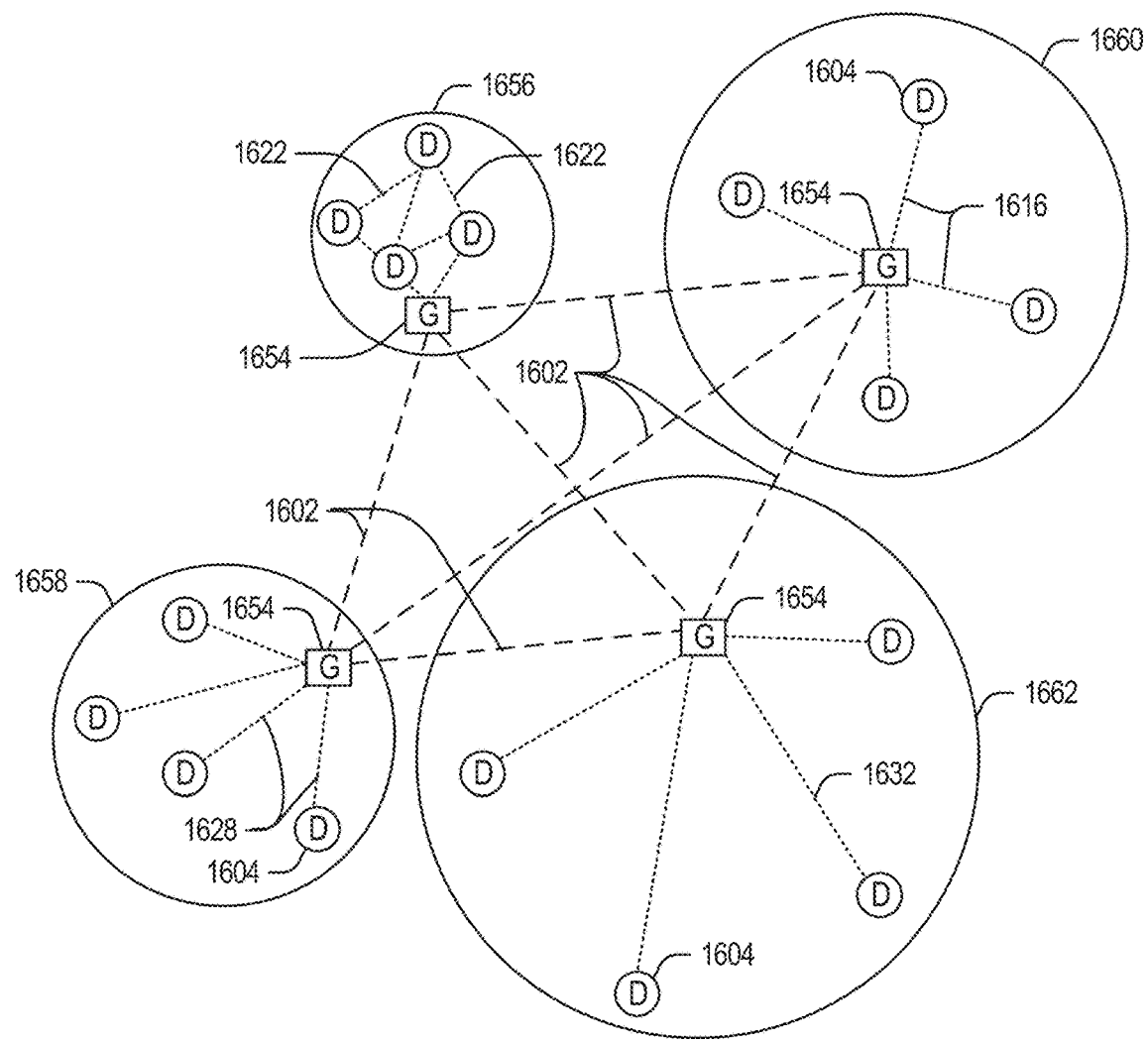
FIG. 16 illustrates a domain topology for respective internet-of-things (IoT) networks coupled through links to respective gateways, according to an example.

FIG. 16 illustrates an example domain topology for respective internet-of-things (IoT) networks coupled through links to respective gateways. The Internet of Things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

Figure 17:
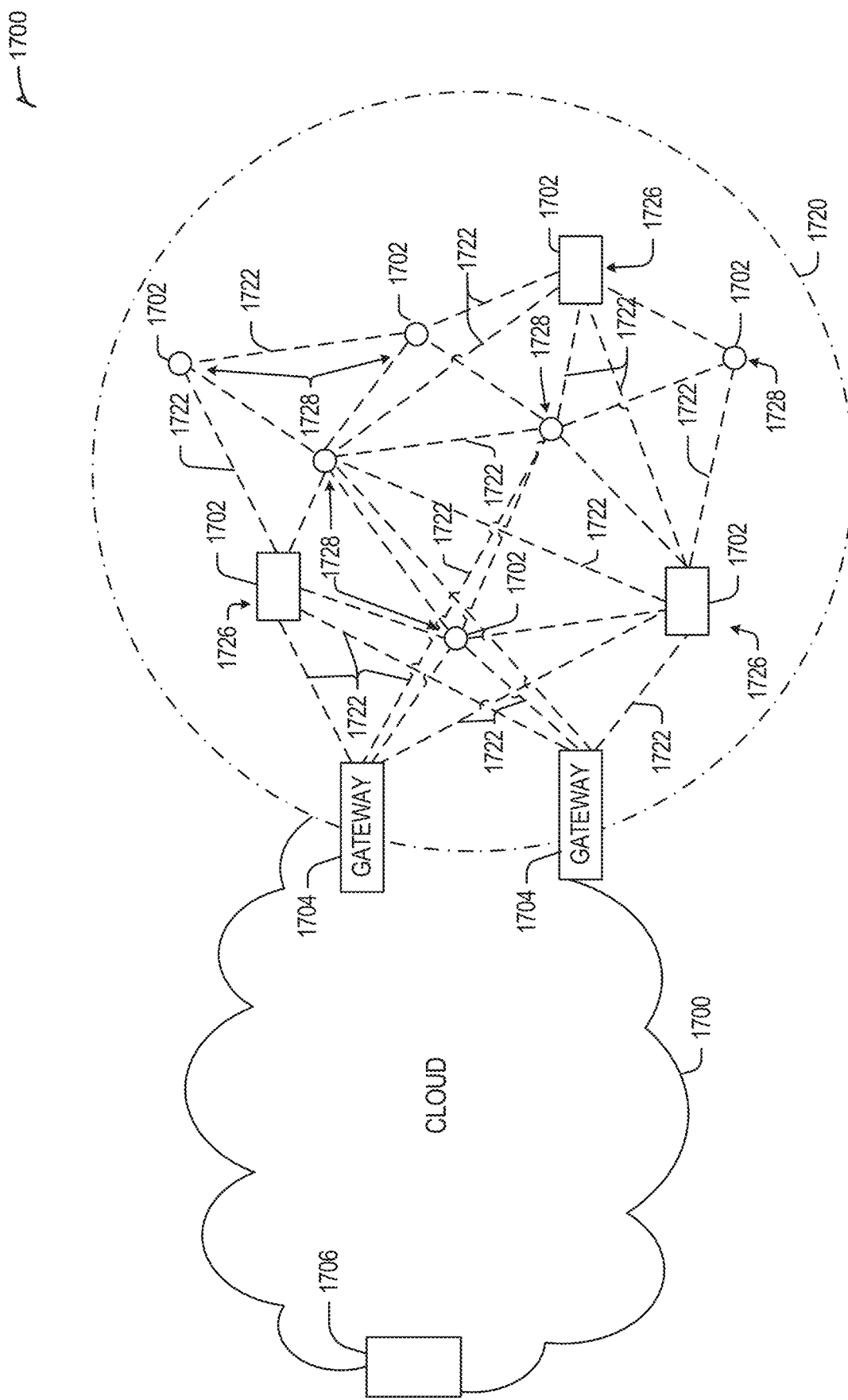
FIG. 17 illustrates a cloud computing network in communication with a mesh network of IoT devices operating as a fog device at the edge of the cloud computing network, according to an example.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 16 and 17, present a number of new challenges in a heterogeneous network of connectivity comprising a combination of wired and wireless technologies.

FIG. 16 specifically provides a simplified drawing of a domain topology that may be used for a number of internet-of-things (IoT) networks comprising IoT devices 1604, with the IoT networks 1656, 1658, 1660, 1662, coupled through backbone links 1602 to respective gateways 1654. For example, a number of IoT devices 1604 may communicate with a gateway 1654, and with each other through the gateway 1654. To simplify the drawing, not every IoT device 1604, or communications link (e.g., link 1616, 1622, 1628, or 1632) is labeled. The backbone links 1602 may include any number of wired or wireless technologies, including optical networks, and may be part of a local area network (LAN), a wide area network (WAN), or the Internet. Additionally, such communication links facilitate optical signal paths among both IoT devices 1604 and gateways 1654, including the use of MUXing/deMUXing components that facilitate interconnection of the various devices.

The network topology may include any number of types of IoT networks, such as a mesh network provided with the network 1656 using Bluetooth low energy (BLE) links 1622. Other types of IoT networks that may be present include a wireless local area network (WLAN) network 1658 used to communicate with IoT devices 1604 through IEEE 802.11 (Wi-Fi®) links 1628, a cellular network 1660 used to communicate with IoT devices 1604 through an LTE/LTE-A (4G) or 5G cellular network, and a low-power wide area (LPWA) network 1662, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into "fog" devices or integrated into "edge" computing systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1604, such as over the backbone links 1602, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability, and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 1656, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1658, for instance, may use systems that perform standards conversion to provide multi-standard connectivity, enabling IoT devices 1604 using different protocols to communicate. Further systems may provide seamless interconnectivity across a multi-standard infrastructure comprising visible Internet resources and hidden Internet resources.

Communications in the cellular network 1660, for instance, may be enhanced by systems that offload data, extend communications to more remote devices, or both. The LPWA network 1662 may include systems that perform non-Internet protocol (IP) to IP interconnections, addressing, and routing. Further, each of the IoT devices 1604 may include the appropriate transceiver for wide area communications with that device. Further, each IoT device 1604 may include other transceivers for communications using additional protocols and frequencies. This is discussed further with respect to the communication environment and hardware of an IoT processing device depicted in FIGS. 18 and 19.

Finally, clusters of IoT devices may be equipped to communicate with other IoT devices as well as with a cloud network. This may allow the IoT devices to form an ad-hoc network between the devices, allowing them to function as a single device, which may be termed a fog device, fog platform, or fog network. This configuration is discussed further with respect to FIG. 17 below.

FIG. 17 illustrates a cloud computing network in communication with a mesh network of IoT devices (devices 1702) operating as a fog platform in a networked scenario. The mesh network of IoT devices may be termed a fog network 1720, established from a network of devices operating at the edge of the cloud 1700. To simplify the diagram, not every IoT device 1702 is labeled.

The fog network 1720 may be considered to be a massively interconnected network wherein a number of IoT devices 1702 are in communications with each other, for example, by radio links 1722. The fog network 1720 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 1720 may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 1702 are shown in this example, gateways 1704, data aggregators 1726, and sensors 1728, although any combinations of IoT devices 1702 and functionality may be used. The gateways 1704 may be edge devices that provide communications between the cloud 1700 and the fog network 1720, and may also provide the backend process function for data obtained from sensors 1728, such as motion data, flow data, temperature data, and the like. The data aggregators 1726 may collect data from any number of the sensors 1728, and perform the back end processing function for the analysis. The results, raw data, or both may be passed along to the cloud 1700 through the gateways 1704. The sensors 1728 may be full IoT devices 1702, for example, capable of both collecting data and processing the data. In some cases, the sensors 1728 may be more limited in functionality, for example, collecting the data and allowing the data aggregators 1726 or gateways 1704 to process the data.

Communications from any IoT device 1702 may be passed along a convenient path between any of the IoT devices 1702 to reach the gateways 1704. In these networks, the number of interconnections provide substantial redundancy, allowing communications to be maintained, even with the loss of a number of IoT devices 1702. Further, the use of a mesh network may allow IoT devices 1702 that are very low power or located at a distance from infrastructure to be used, as the range to connect to another IoT device 1702 may be much less than the range to connect to the gateways 1704.

The fog network 1720 provided from these IoT devices 1702 may be presented to devices in the cloud 1700, such as a server 1706, as a single device located at the edge of the cloud 1700, e.g., a fog network operating as a device or platform. In this example, the alerts coming from the fog platform may be sent without being identified as coming from a specific IoT device 1702 within the fog network 1720. In this fashion, the fog network 1720 may be considered a distributed platform that provides computing and storage resources to perform processing or data-intensive tasks such as data analytics, data aggregation, and machine-learning, among others.

In some examples, the IoT devices 1702 may be configured using an imperative programming style, e.g., with each IoT device 1702 having a specific function and communication partners. However, the IoT devices 1702 forming the fog platform may be configured in a declarative programming style, enabling the IoT devices 1702 to reconfigure their operations and communications, such as to determine needed resources in response to conditions, queries, and device failures. As an example, a query from a user located at a server 1706 about the operations of a subset of equipment monitored by the IoT devices 1702 may result in the fog network 1720 device the IoT devices 1702, such as particular sensors 1728, needed to answer the query. The data from these sensors 1728 may then be aggregated and analyzed by any combination of the sensors 1728, data aggregators 1726, or gateways 1704, before being sent on by the fog network 1720 to the server 1706 to answer the query. In this example, IoT devices 1702 in the fog network 1720 may select the sensors 1728 used based on the query, such as adding data from flow sensors or temperature sensors.

Further, if some of the IoT devices 1702 are not operational, other IoT devices 1702 in the fog network 1720 may provide analogous data, if available.

In other examples, the operations and functionality described herein may be embodied by an IoT or edge compute device in the example form of an electronic processing system, within which a set or sequence of instructions may be executed to cause the electronic processing system to perform any one of the methodologies discussed herein, according to an example embodiment. The device may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine.

Further, while only a single machine may be depicted and referenced in the examples above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor, set of processors, or processing circuitry (e.g., a computer) to individually or jointly execute instructions to perform any one or more of the methodologies discussed herein. Accordingly, in various examples, applicable means for processing (e.g., processing, controlling, generating, evaluating, etc.) may be embodied by such processing circuitry.

Figure 18:
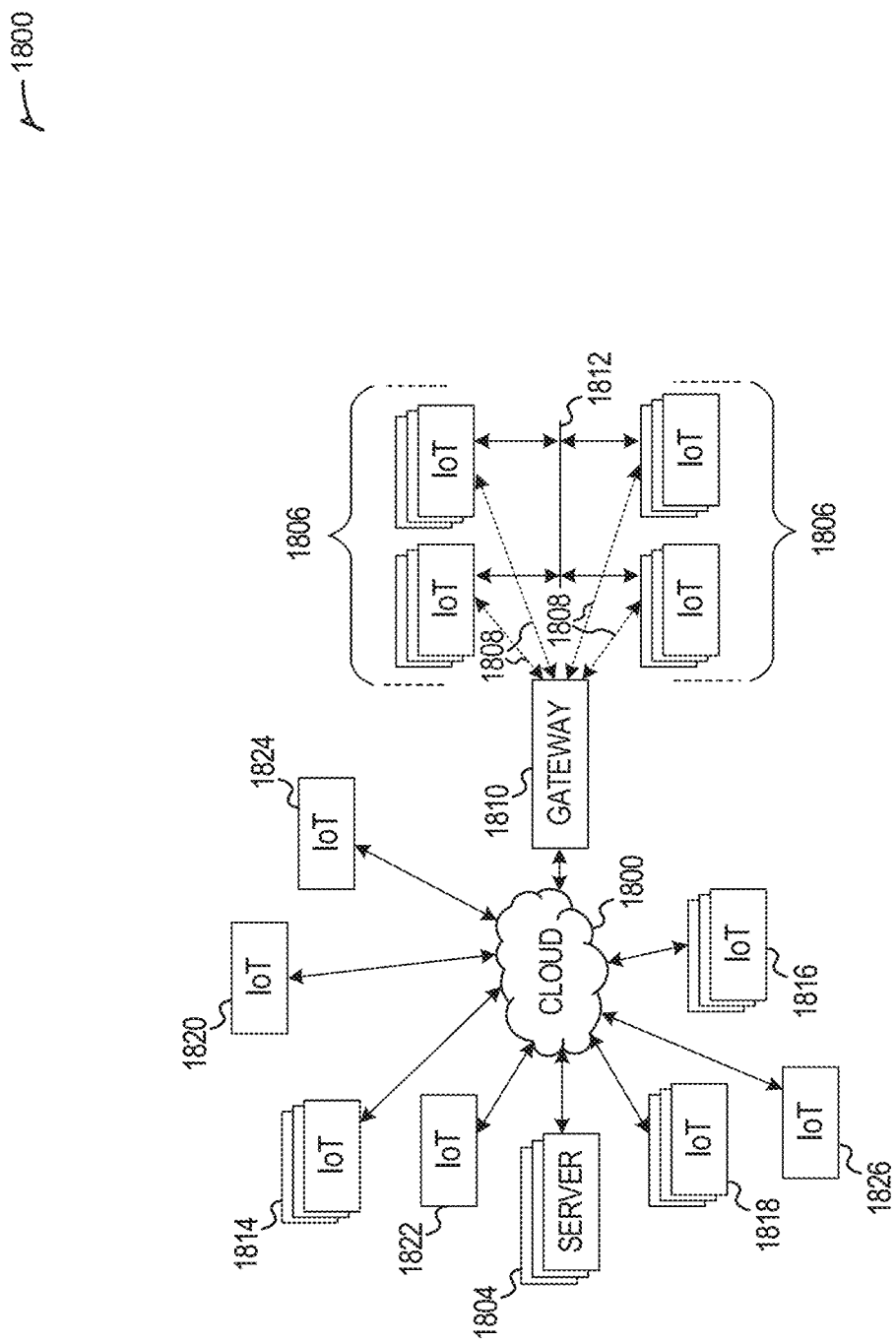
FIG. 18 illustrates a drawing of a cloud computing network, or cloud, in communication with a number of Internet of Things (IoT) devices, according to an example.

FIG. 18 illustrates a drawing of a cloud computing network, or cloud 1800, in communication with a number of Internet of Things (IoT) devices. The cloud 1800 may represent the Internet, or may be a local area network (LAN), or a wide area network (WAN), such as a proprietary network for a company. The IoT devices may include any number of different types of devices, grouped in various combinations. For example, a traffic control group 1806 may include IoT devices along streets in a city. These IoT devices may include stoplights, traffic flow monitors, cameras, weather sensors, and the like. The traffic control group 1806, or other subgroups, may be in communication with the cloud 1800 through wired or wireless links 1808, such as LPWA links, and the like. Further, a wired or wireless sub-network 1812 may allow the IoT devices to communicate with each other, such as through a local area network, a wireless local area network, and the like. The IoT devices may use another device, such as a gateway 1810 or 1828 to communicate with remote locations such as the cloud 1800; the IoT devices may also use one or more servers 1830 to facilitate communication with the cloud 1800 or with the gateway 1810. For example, the one or more servers 1830 may operate as an intermediate network node to support a local edge cloud or fog implementation among a local area network. Further, the gateway 1828 that is depicted may operate in a cloud-to-gateway-to-many edge devices configuration, such as with the various IoT devices 1814, 1820, 1824 being constrained or dynamic to an assignment and use of resources in the cloud 1800.

Other example groups of IoT devices may include remote weather stations 1814, local information terminals 1816, alarm systems 1818, automated teller machines 1820, alarm panels 1822, or moving vehicles, such as emergency vehicles 1824 or other vehicles 1826, among many others. Each of these IoT devices may be in communication with other IoT devices, with servers 1804, with another IoT fog device or system (not shown, but depicted in FIG. 17), or a combination therein. The groups of IoT devices may be deployed in various residential, commercial, and industrial settings (including in both private or public environments).

As may be seen from FIG. 18, a large number of IoT devices may be communicating through the cloud 1800. This may allow different IoT devices to request or provide information to other devices autonomously. For example, a group of IoT devices (e.g., the traffic control group 1806) may request a current weather forecast from a group of remote weather stations 1814, which may provide the forecast without human intervention. Further, an emergency vehicle 1824 may be alerted by an automated teller machine 1820 that a burglary is in progress. As the emergency vehicle 1824 proceeds towards the automated teller machine 1820, it may access the traffic control group 1806 to request clearance to the location, for example, by lights turning red to block cross traffic at an intersection in sufficient time for the emergency vehicle 1824 to have unimpeded access to the intersection.

Clusters of IoT devices, such as the remote weather stations 1814 or the traffic control group 1806, may be equipped to communicate with other IoT devices as well as with the cloud 1800. This may allow the IoT devices to form an ad-hoc network between the devices, allowing them to function as a single device, which may be termed a fog device or system (e.g., as described above with reference to FIG. 17).

Figure 19:
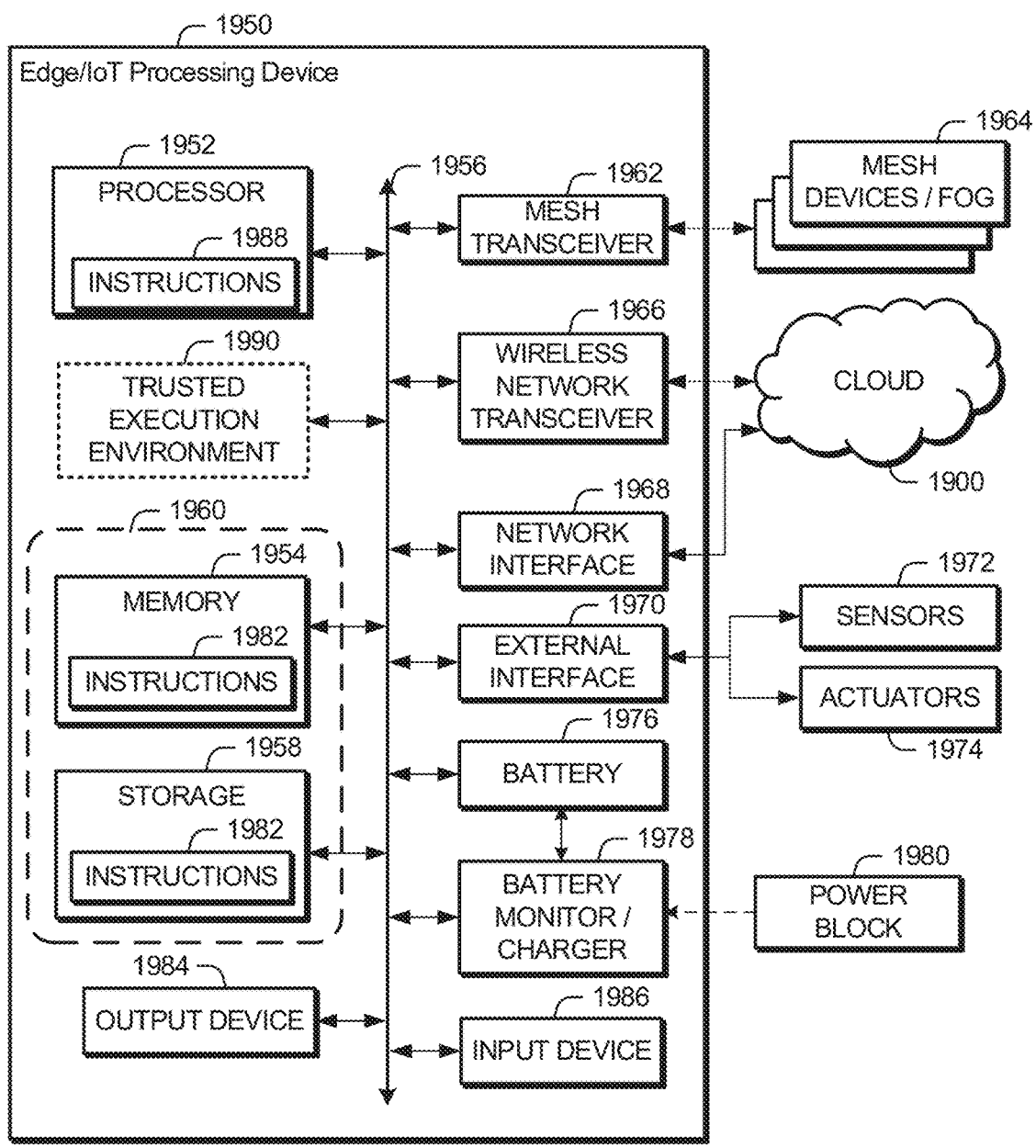
FIG. 19 illustrates a block diagram for an example IoT processing system architecture upon which any one or more of the techniques (e.g., operations, processes, methods, and methodologies) discussed herein may be performed, according to an example.

FIG. 19 is a block diagram of an example of components that may be present in an IoT device 1950 for implementing the techniques described herein. The IoT device 1950 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1950, or as components otherwise incorporated within a chassis of a larger system. Additionally, the block diagram of FIG. 19 is intended to depict a high-level view of components of the IoT device 1950. However, some of the components shown may be omitted, additional components may be present, and different arrangement of the components shown may occur in other implementations.

The IoT device 1950 may include processing circuitry in the form of a processor 1952, which may be a microprocessor, a multi-core processor, a multithreaded processor, an ultra-low voltage processor, an embedded processor, or other known processing elements. The processor 1952 may be a part of a system on a chip (SoC) in which the processor 1952 and other components are formed into a single integrated circuit, or a single package, such as the Edison™ or Galileo™ SoC boards from Intel. As an example, the processor 1952 may include an Intel® Architecture Core™ based processor, such as a Quark™, an Atom™, an i3, an i5, an i7, or an MCU-class processor, or another such processor available from Intel® Corporation, Santa Clara, CA However, any number other processors may be used, such as available from Advanced Micro Devices, Inc. (AMD) of Sunnyvale, CA, a MIPS-based design from MIPS Technologies, Inc. of Sunnyvale, CA, an ARM-based design licensed from ARM Holdings, Ltd. or customer thereof, or their licensees or adopters. The processors may include units such as an A5-A14 processor from Apple® Inc., a Snapdragon™ processor from Qualcomm® Technologies, Inc., or an OMAP™ processor from Texas Instruments, Inc.

The processor 1952 may communicate with a system memory 1954 over an interconnect 1956 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1958 may also couple to the processor 1952 via the interconnect 1956. In an example the storage 1958 may be implemented via a solid state disk drive (SSDD). Other devices that may be used for the storage 1958 include flash memory cards, such as SD cards, microSD cards, xD picture cards, and the like, and USB flash drives. In low power implementations, the storage 1958 may be on-die memory or registers associated with the processor 1952. However, in some examples, the storage 1958 may be implemented using a micro hard disk drive (HDD). Further, any number of new technologies may be used for the storage 1958 in addition to, or instead of, the technologies described, such resistance change memories, phase change memories, holographic memories, or chemical memories, among others.

The components may communicate over the interconnect 1956. The interconnect 1956 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1956 may be a proprietary bus, for example, used in a SoC based system. Other bus systems may be included, such as an I2C interface, an SPI interface, point to point interfaces, and a power bus, among others.

Given the variety of types of applicable communications from the device to another component or network, applicable communications circuitry used by the device may include or be embodied by any one or more of components 1962, 1966, 1968, or 1970. Accordingly, in various examples, applicable means for communicating (e.g., receiving, transmitting, etc.) may be embodied by such communications circuitry.

The interconnect 1956 may couple the processor 1952 to a mesh transceiver 1962, for communications with other mesh devices 1964. The mesh transceiver 1962 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1964. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1962 may communicate using multiple standards or radios for communications at different range. For example, the IoT device 1950 may communicate with close devices, e.g., within about 10 meters, using a local transceiver based on BLE, or another low power radio, to save power. More distant mesh devices 1964, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1966 may be included to communicate with devices or services in the cloud 1900 via local or wide area network protocols. The wireless network transceiver 1966 may be a LPWA transceiver that follows the IEEE 802.15.4, or IEEE 802.15.4g standards, among others. The IoT device 1950 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1962 and wireless network transceiver 1966, as described herein. For example, the radio transceivers 1962 and 1966 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1962 and 1966 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1966, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1968 may be included to provide a wired communication to the cloud 1900 or to other devices, such as the mesh devices 1964. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1968 may be included to allow connect to a second network, for example, a NIC 1968 providing communications to the cloud over Ethernet, and a second NIC 1968 providing communications to other devices over another type of network.

The interconnect 1956 may couple the processor 1952 to an external interface 1970 that is used to connect external devices or subsystems. The external devices may include sensors 1972, such as accelerometers, level sensors, flow sensors, optical light sensors, camera sensors, temperature sensors, a global positioning system (GPS) sensors, pressure sensors, barometric pressure sensors, and the like. The external interface 1970 further may be used to connect the IoT device 1950 to actuators 1974, such as power switches, valve actuators, an audible sound generator, a visual warning device, and the like.

In some optional examples, various input/output (I/O) devices may be present within, or connected to, the IoT device 1950. For example, a display or other output device 1984 may be included to show information, such as sensor readings or actuator position. An input device 1986, such as a touch screen or keypad may be included to accept input. An output device 1986 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1950.

A battery 1976 may power the IoT device 1950, although in examples in which the IoT device 1950 is mounted in a fixed location, it may have a power supply coupled to an electrical grid. The battery 1976 may be a lithium ion battery, or a metal-air battery, such as a zinc-air battery, an aluminum-air battery, a lithium-air battery, and the like.

A battery monitor/charger 1978 may be included in the IoT device 1950 to track the state of charge (SoCh) of the battery 1976. The battery monitor/charger 1978 may be used to monitor other parameters of the battery 1976 to provide failure predictions, such as the state of health (SoH) and the state of function (SoF) of the battery 1976. The battery monitor/charger 1978 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1978 may communicate the information on the battery 1976 to the processor 1952 over the interconnect 1956. The battery monitor/charger 1978 may also include an analog-to-digital (ADC) convertor that allows the processor 1952 to directly monitor the voltage of the battery 1976 or the current flow from the battery 1976. The battery parameters may be used to determine actions that the IoT device 1950 may perform, such as transmission frequency, mesh network operation, sensing frequency, and the like.

A power block 1980, or other power supply coupled to a grid, may be coupled with the battery monitor/charger 1978 to charge the battery 1976. In some examples, the power block 1980 may be replaced with a wireless power receiver to obtain the power wirelessly, for example, through a loop antenna in the IoT device 1950. A wireless battery charging circuit, such as an LTC4020 chip from Linear Technologies of Milpitas, CA, among others, may be included in the battery monitor/charger 1978. The specific charging circuits chosen depend on the size of the battery 1976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1958 may include instructions 1982 in the form of software, firmware, or hardware commands to implement the techniques described herein. Although such instructions 1982 are shown as code blocks included in the memory 1954 and the storage 1958, it may be understood that any of the code blocks may be replaced with hardwired circuits, for example, built into an application specific integrated circuit (ASIC).

In an example, the instructions 1982 provided via the memory 1954, the storage 1958, or the processor 1952 may be embodied as a non-transitory, machine readable medium 1960 including code to direct the processor 1952 to perform electronic operations in the IoT device 1950. The processor 1952 may access the non-transitory, machine readable medium 1960 over the interconnect 1956. For instance, the non-transitory, machine readable medium 1960 may be embodied by devices described for the storage 1958 of FIG. 19 or may include specific storage units such as optical disks, flash drives, or any number of other hardware devices. The non-transitory, machine readable medium 1960 may include instructions to direct the processor 1952 to perform a specific sequence or flow of actions, for example, as described with respect to the flowchart(s) and block diagram (s) of operations and functionality depicted above.

Also in a specific example, the instructions 1988 on the processor 1952 (separately, or in combination with the instructions 1988 of the machine readable medium 1960) may configure execution or operation of a trusted execution environment (TEE) 1990. In an example, the TEE 1990 operates as a protected area accessible to the processor 1952 for secure execution of instructions and secure access to data. Various implementations of the TEE 1990, and an accompanying secure area in the processor 1952 or the memory 1954 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1950 through the TEE 1990 and the processor 1952.

Figure 20:
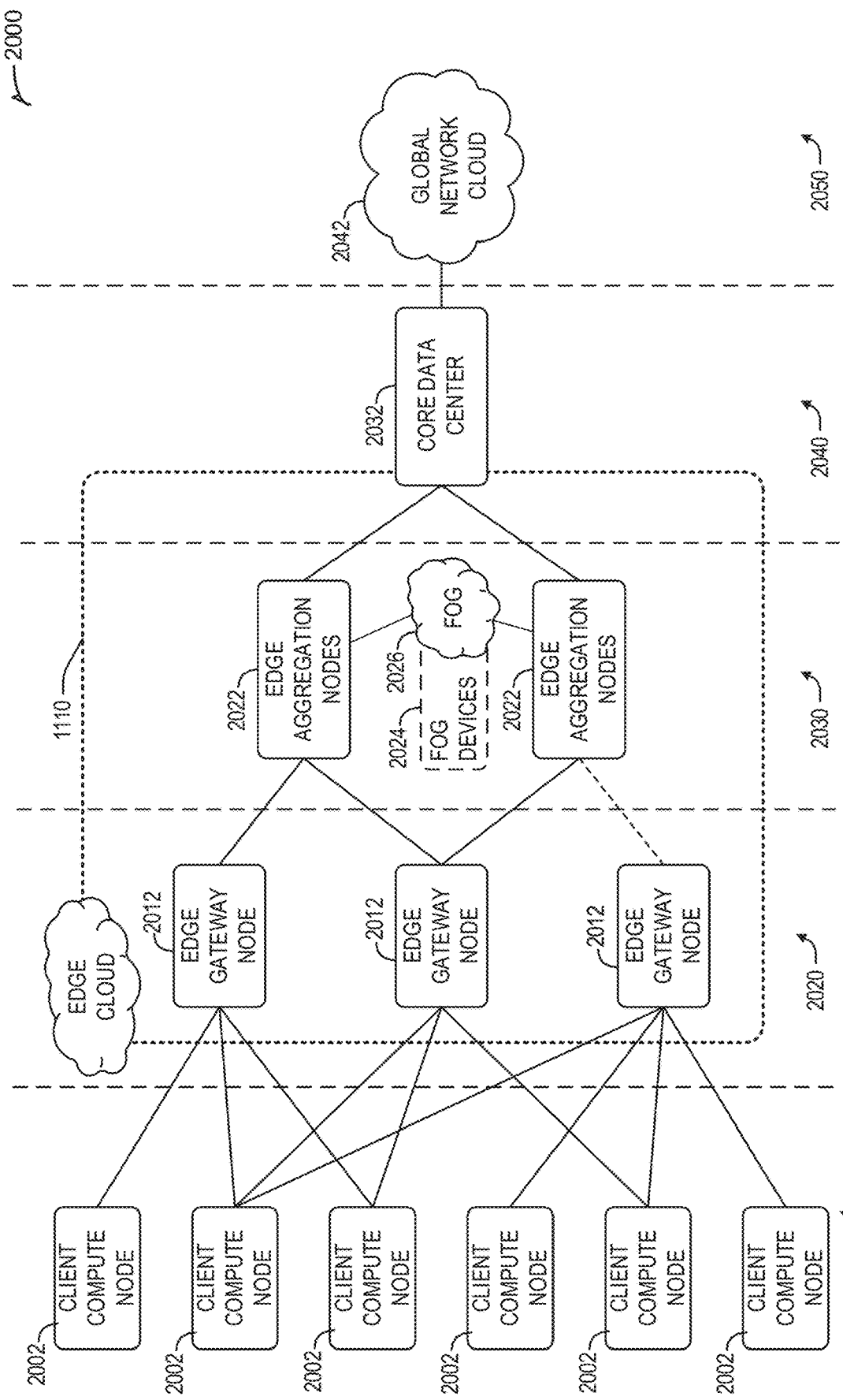
FIG. 20 illustrates an overview of layers of distributed compute deployed among an edge computing system, according to an example.

At a more generic level, an edge computing system may be described to encompass any number of deployments operating in an edge cloud 1110, which provide coordination from client and distributed computing devices. FIG. 20 provides a further abstracted overview of layers of distributed compute deployed among an edge computing environment for purposes of illustration.

FIG. 20 generically depicts an edge computing system for providing edge services and applications to multi-stakeholder entities, as distributed among one or more client compute nodes 2002, one or more edge gateway nodes 2012, one or more edge aggregation nodes 2022, one or more core data centers 2032, and a global network cloud 2042, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 2010, 2020, 2030, 2040, 2050. For example, the client compute nodes 2002 are each located at an endpoint layer 2010, while each of the edge gateway nodes 2012 are located at an edge devices layer 2020 (local level) of the edge computing system. Additionally, each of the edge aggregation nodes 2022 (and/or fog devices 2024, if arranged or operated with or among a fog networking configuration 2026) are located at a network access layer 2030 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 2032 is located at a core network layer 2040 (e.g., a regional or geographically-central level), while the global network cloud 2042 is located at a cloud data center layer 2050 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 2032 may be located within, at, or near the edge cloud 1110.

Although an illustrative number of client compute nodes 2002, edge gateway nodes 2012, edge aggregation nodes 2022, core data centers 2032, global network clouds 2042 are shown in FIG. 20, it should be appreciated that the edge computing system may include more or fewer devices or systems at each layer. Additionally, as shown in FIG. 20, the number of components of each layer 2010, 2020, 2030, 2040, 2050 generally increases at each lower level (i.e., when moving closer to endpoints). As such, one edge gateway node 2012 may service multiple client compute nodes 2002, and one edge aggregation node 2022 may service multiple edge gateway nodes 2012.

Consistent with the examples provided herein, each client compute node 2002 may be embodied as any type of end point component, device, appliance, or "thing" capable of communicating as a producer or consumer of data. Further, the label "node" or "device" as used in the edge computing system 2000 does not necessarily mean that such node or device operates in a client or agent/minion/follower role; rather, any of the nodes or devices in the edge computing system 2000 refer to individual entities, nodes, or subsystems which include discrete or connected hardware or software configurations to facilitate or use the edge cloud 1110.

As such, the edge cloud 1110 is formed from network components and functional features operated by and within the edge gateway nodes 2012 and the edge aggregation nodes 2022 of layers 2020, 2030, respectively. The edge cloud 1110 may be embodied as any type of network that provides edge computing and/or storage resources which are proximately located to radio access network (RAN) capable endpoint devices (e.g., mobile computing devices, IoT devices, smart devices, etc.), which are shown in FIG. 20 as the client compute nodes 2002. In other words, the edge cloud 1110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 1110 may form a portion of or otherwise provide an ingress point into or across a fog networking configuration 2026 (e.g., a network of fog devices 2024, not shown in detail), which may be embodied as a system-level horizontal and distributed architecture that distributes resources and services to perform a specific function. For instance, a coordinated and distributed network of fog devices 2024 may perform computing, storage, control, or networking aspects in the context of an IoT system arrangement. Other networked, aggregated, and distributed functions may exist in the edge cloud 1110 between the cloud data center layer 2050 and the client endpoints (e.g., client compute nodes 2002). Some of these are discussed in the following sections in the context of network functions or service virtualization, including the use of virtual edges and virtual services which are orchestrated for multiple stakeholders.

The edge gateway nodes 2012 and the edge aggregation nodes 2022 cooperate to provide various edge services and security to the client compute nodes 2002. Furthermore, because each client compute node 2002 may be stationary or mobile, each edge gateway node 2012 may cooperate with other edge gateway devices to propagate presently provided edge services and security as the corresponding client compute node 2002 moves about a region. To do so, each of the edge gateway nodes 2012 and/or edge aggregation nodes 2022 may support multiple tenancy and multiple stakeholder configurations, in which services from (or hosted for) multiple service providers and multiple consumers may be supported and coordinated across a single or multiple compute devices.

Figure 21:
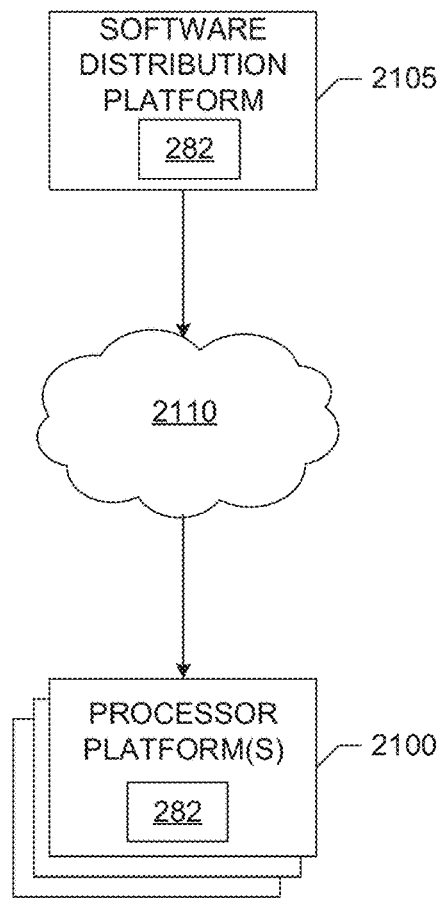
FIG. 21 illustrates an example software distribution platform, according to an example.

FIG. 21 illustrates an example software distribution platform 2105 to distribute software, such as the example computer readable instructions 282 of FIG. 2B, to one or more devices, such as example processor platform(s) 2100 and/or example connected edge devices 262. The example software distribution platform 2105 may be implemented by any computer server, data facility, cloud service, etc., capable of storing and transmitting software to other computing devices (e.g., third parties, the example connected edge devices 262 of FIG. 2B). Example connected edge devices may be customers, clients, managing devices (e.g., servers), third parties (e.g., customers of an entity owning and/or operating the software distribution platform 2105). Example connected edge devices may operate in commercial and/or home automation environments. In some examples, a third party is a developer, a seller, and/or a licensor of software such as the example computer readable instructions 282 of FIG. 2B. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 21, the software distribution platform 2105 includes one or more servers and one or more storage devices. The storage devices store the computer readable instructions 282, which may correspond to the example computer readable instructions 282 of FIG. 2B, as described above. The one or more servers of the example software distribution platform 2105 are in communication with a network 2110, which may correspond to any one or more of the Internet and/or any of the example networks 295 described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 282 from the software distribution platform 2105. For example, the software, which may correspond to the example computer readable instructions 282 of FIG. 2B, may be downloaded to the example processor platform(s) 2100 (e.g., example connected edge devices), which is/are to execute the computer readable instructions 282 to implement the software. In some examples, one or more servers of the software distribution platform 2105 are communicatively connected to one or more security domains and/or security devices through which requests and transmissions of the example computer readable instructions 282 must pass. In some examples, one or more servers of the software distribution platform 2105 periodically offer, transmit, and/or force updates to the software (e.g., the example computer readable instructions 282 of FIG. 2B) to ensure improvements, patches, updates, etc. are distributed and applied to the software at the end user devices.

In the illustrated example of FIG. 21, the computer readable instructions 282 are stored on storage devices of the software distribution platform 2105 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 282 stored in the software distribution platform 2105 are in a first format when transmitted to the example processor platform(s) 2100. In some examples, the first format is an executable binary in which particular types of the processor platform(s) 2100 can execute. However, in some examples, the first format is uncompiled code that requires one or more preparation tasks to transform the first format to a second format to enable execution on the example processor platform(s) 2100. For instance, the receiving processor platform(s) 2100 may need to compile the computer readable instructions 282 in the first format to generate executable code in a second format that is capable of being executed on the processor platform(s) 2100. In still other examples, the first format is interpreted code that, upon reaching the processor platform(s) 2100, is interpreted by an interpreter to facilitate execution of instructions.

EXAMPLES

Illustrative examples of the technologies disclosed herein are provided below. An embodiment of the technologies may include any one or more, and any combination of, the examples described below.

Example 1 includes a data node for processing distributed files, the data node comprising a processor; a memory; a data storage device; one or more computer-readable media comprising a plurality of instructions stored thereon that, when executed by the data node, cause the data node to receive an instruction to query an object of a distributed file system (DFS) stored on the data storage device of the data node, wherein the object comprises a plurality of data elements; determine block mapping of the object on the data storage device, wherein the block mapping indicates a location of each of the plurality of data elements on the data storage device; and query, by the data storage device and based on the block mapping of the object, each of the plurality of data elements of the object.

Example 2 includes the subject matter of Example 1, and wherein to determine the block mapping of the object of the data storage device comprises to parse a manifest of the object, wherein the manifest indicates a location of each of the plurality of data elements in the object; and request, from the data storage device, block mapping of each of the plurality of data elements.

Example 3 includes the subject matter of any of Examples 1 and 2, and wherein the plurality of instructions further causes the data node to create a virtual object for each of the plurality of data elements, wherein each virtual object indicates the block mapping for the corresponding data element; and send the virtual object corresponding to each of the plurality of data elements to the data storage device.

Example 4 includes the subject matter of any of Examples 1-3, and wherein to send the virtual object corresponding to each of the plurality of data elements to the data storage device comprises to create a compute descriptor for each of the plurality of data elements, wherein each compute descriptor includes the corresponding virtual object and an indication of the query to be performed on the corresponding data element; and send the compute descriptor for each of the plurality of data elements to the data storage device.

Example 5 includes the subject matter of any of Examples 1-4, and wherein to send the compute descriptor for each of the plurality of data elements to the data storage device comprises to send a non-volatile memory express (NVMe) pass-through command to the data storage device.

Example 6 includes the subject matter of any of Examples 1-5, and wherein to determine the block mapping of the object of the data storage device comprises to parse, by the data storage device, a manifest of the object.

Example 7 includes the subject matter of any of Examples 1-6, and wherein to query, by the data storage device and based on the block mapping of the object, each of the plurality of data elements of the object comprises to, for each of the plurality of data elements load the corresponding data element in local memory of the data storage device; process the corresponding data element with use of a processor or accelerator of the data storage device.

Example 8 includes the subject matter of any of Examples 1-7, and wherein the object size is between 32 megabytes and 512 megabytes.

Example 9 includes a system comprising the data node of any of Examples 1-8, further comprising a name node comprising a processor; a memory; one or more computer-readable media comprising a plurality of instructions stored thereon that, when executed by the name node, cause the name node to determine an object size for the DFS; combine an additional plurality of data elements into a file, the file to be split into a plurality of objects having a size equal to the DFS object size for storage on the DFS, wherein to combine the additional plurality of data elements comprises to add padding between some of the data elements so that no element of the additional plurality of data elements spans a boundary between objects of the plurality of objects; split the file into the plurality of objects; and send different objects of the plurality of objects to different data nodes in order to store the file in the DFS, wherein to send different objects of the plurality of objects to different data nodes comprises to send the object to the data node.

Example 10 includes a method for processing distributed files, the method comprising receiving, by a data node, an instruction to query an object of a distributed file system (DFS) stored on a data storage device of the data node, wherein the object comprises a plurality of data elements; determining, by the data node, block mapping of the object on the data storage device, wherein the block mapping indicates a location of each of the plurality of data elements on the data storage device; and querying, by the data storage device and based on the block mapping of the object, each of the plurality of data elements of the object.

Example 11 includes the subject matter of Example 10, and wherein determining the block mapping of the object of the data storage device comprises parsing, by the data node, a manifest of the object, wherein the manifest indicates a location of each of the plurality of data elements in the object; and requesting, by the data node and from the data storage device, block mapping of each of the plurality of data elements.

Example 12 includes the subject matter of any of Examples 10 and 11, and further including creating, by the data node, a virtual object for each of the plurality of data elements, wherein each virtual object indicates the block mapping for the corresponding data element; and sending, by the data node, the virtual object corresponding to each of the plurality of data elements to the data storage device.

Example 13 includes the subject matter of any of Examples 10-12, and wherein sending the virtual object corresponding to each of the plurality of data elements to the data storage device comprises creating, by the data node, a compute descriptor for each of the plurality of data elements, wherein each compute descriptor includes the corresponding virtual object and an indication of the query to be performed on the corresponding data element; and sending, by the data node, the compute descriptor for each of the plurality of data elements to the data storage device.

Example 14 includes the subject matter of any of Examples 10-13, and wherein sending, by the data node, the compute descriptor for each of the plurality of data elements to the data storage device comprises sending a non-volatile memory express (NVMe) pass-through command to the data storage device.

Example 15 includes the subject matter of any of Examples 10-14, and wherein determining the block mapping of the object of the data storage device comprises parsing, by the data storage device, a manifest of the object.

Example 16 includes the subject matter of any of Examples 10-15, and wherein querying, by the data storage device and based on the block mapping of the object, each of the plurality of data elements of the object comprises, for each of the plurality of data elements loading the corresponding data element in local memory of the data storage device; processing the corresponding data element with use of a processor or accelerator of the data storage device.

Example 17 includes one or more computer-readable media comprising a plurality of instructions stored thereon that, when executed by a data node, causes the data node to receive an instruction to query an object of a distributed file system (DFS) stored on a data storage device of the data node, wherein the object comprises a plurality of data elements; determine block mapping of the object on the data storage device, wherein the block mapping indicates a location of each of the plurality of data elements on the data storage device; and query, by the data storage device and based on the block mapping of the object, each of the plurality of data elements of the object.

Example 18 includes the subject matter of Example 17, and wherein to determine the block mapping of the object of the data storage device comprises to parse a manifest of the object, wherein the manifest indicates a location of each of the plurality of data elements in the object; and request, from the data storage device, block mapping of each of the plurality of data elements.

Example 19 includes the subject matter of any of Examples 17 and 18, and wherein the plurality of instructions further cause the data node to create a virtual object for each of the plurality of data elements, wherein each virtual object indicates the block mapping for the corresponding data element; and send the virtual object corresponding to each of the plurality of data elements to the data storage device.

Example 20 includes the subject matter of any of Examples 17-19, and wherein to send the virtual object corresponding to each of the plurality of data elements to the data storage device comprises to create a compute descriptor for each of the plurality of data elements, wherein each compute descriptor includes the corresponding virtual object and an indication of the query to be performed on the corresponding data element; and send the compute descriptor for each of the plurality of data elements to the data storage device.

Example 21 includes the subject matter of any of Examples 17-20, and wherein to send the compute descriptor for each of the plurality of data elements to the data storage device comprises to send a non-volatile memory express (NVMe) pass-through command to the data storage device.

Example 22 includes the subject matter of any of Examples 17-21, and wherein to determine the block mapping of the object of the data storage device comprises to parse, by the data storage device, a manifest of the object.

Example 23 includes the subject matter of any of Examples 17-22, and wherein to query, by the data storage device and based on the block mapping of the object, each of the plurality of data elements of the object comprises to, for each of the plurality of data elements load the corresponding data element in local memory of the data storage device; process the corresponding data element with use of a processor or accelerator of the data storage device.

Example 24 includes a data node for processing distributed files, the data node comprising means for receiving an instruction to query an object of a distributed file system (DFS) stored on a data storage device of the data node, wherein the object comprises a plurality of data elements; means for determining block mapping of the object on the data storage device, wherein the block mapping indicates a location of each of the plurality of data elements on the data storage device; and means for querying, by the data storage device and based on the block mapping of the object, each of the plurality of data elements of the object.

Example 25 includes the subject matter of Example 24, and wherein the means for determining the block mapping of the object of the data storage device comprises means for parsing a manifest of the object, wherein the manifest indicates a location of each of the plurality of data elements in the object; and means for requesting, from the data storage device, block mapping of each of the plurality of data elements.

Example 26 includes the subject matter of any of Examples 24 and 25, and further including means for creating a virtual object for each of the plurality of data elements, wherein each virtual object indicates the block mapping for the corresponding data element; and means for sending the virtual object corresponding to each of the plurality of data elements to the data storage device.

Example 27 includes the subject matter of any of Examples 24-26, and wherein the means for sending the virtual object corresponding to each of the plurality of data elements to the data storage device comprises means for creating a compute descriptor for each of the plurality of data elements, wherein each compute descriptor includes the corresponding virtual object and an indication of the query to be performed on the corresponding data element; and means for sending the compute descriptor for each of the plurality of data elements to the data storage device.

Example 28 includes the subject matter of any of Examples 24-27, and wherein the means for sending the compute descriptor for each of the plurality of data elements to the data storage device comprises means for sending a non-volatile memory express (NVMe) pass-through command to the data storage device.

Example 29 includes the subject matter of any of Examples 24-28, and wherein the means for determining the block mapping of the object of the data storage device comprises means for parsing, by the data storage device, a manifest of the object.

Example 30 includes the subject matter of any of Examples 24-29, and wherein the means for querying, by the data storage device and based on the block mapping of the object, each of the plurality of data elements of the object comprises, for each of the plurality of data elements means for loading the corresponding data element in local memory of the data storage device; means for processing the corresponding data element with use of a processor or accelerator of the data storage device.

Example 31 includes a system comprising the data node of any of examples 24-30, further comprising means for receiving an instruction to query an object of a distributed file system (DFS) stored on a data storage device of the data node, wherein the object comprises a plurality of data elements; means for determining block mapping of the object on the data storage device, wherein the block mapping indicates a location of each of the plurality of data elements on the data storage device; and means for querying, by the data storage device and based on the block mapping of the object, each of the plurality of data elements of the object.

Example 32 includes a name node for distributed storage of files, the name node comprising a processor; a memory; one or more computer-readable media comprising a plurality of instructions stored thereon that, when executed by the name node, cause the name node to determine an object size for a distributed file system (DFS); combine a plurality of data elements into a file, the file to be split into a plurality of objects having a size equal to the DFS object size for storage on the DFS, wherein to combine the plurality of data elements comprises to add padding between some of the data elements so that no element of the plurality of data elements spans a boundary between objects of the plurality of objects; split the file into the plurality of objects; and send different objects of the plurality of objects to different data nodes in order to store the file in the DFS.

Example 33 includes the subject matter of Example 32, and wherein the object size is between 32 megabytes and 512 megabytes.

Example 34 includes a method for distributed storage of files, method comprising determining, by a name node, an object size for a distributed file system (DFS); combining, by the name node, a plurality of data elements into a file, the file to be split into a plurality of objects having a size equal to the DFS object size for storage on the DFS, wherein combining the plurality of data elements comprises adding padding between some of the data elements so that no element of the plurality of data elements spans a boundary between objects of the plurality of objects; splitting, by the name node, the file into the plurality of objects; and sending, by the name node, different objects of the plurality of objects to different data nodes in order to store the file in the DFS.

Example 35 includes the subject matter of Example 34, and wherein the object size is between 32 megabytes and 512 megabytes.

Example 36 includes a name node for distributed storage of files, name node comprising means for determining an object size for a distributed file system (DFS); means for combining a plurality of data elements into a file, the file to be split into a plurality of objects having a size equal to the DFS object size for storage on the DFS, wherein the means for combining the plurality of data elements comprises means for adding padding between some of the data elements so that no element of the plurality of data elements spans a boundary between objects of the plurality of objects; means for splitting the file into the plurality of objects; and means for sending different objects of the plurality of objects to different data nodes in order to store the file in the DFS.

Example 37 includes the subject matter of Example 36, and wherein the object size is between 32 megabytes and 512 megabytes.

Example 38 includes one or more computer-readable media comprising a plurality of instructions stored thereon that, when executed, causes a compute device to determine, an object size for a distributed file system (DFS); combine a plurality of data elements into a file, the file to be split into a plurality of objects having a size equal to the DFS object size for storage on the DFS, wherein to combine the plurality of data elements comprises to add padding between some of the data elements so that no element of the plurality of data elements spans a boundary between objects of the plurality of objects; split the file into the plurality of objects; and send different objects of the plurality of objects to different data nodes in order to store the file in the DFS.

Example 39 includes the subject matter of Example 38, and wherein the object size is between 32 megabytes and 512 megabytes.

In some embodiments, at least one of the systems or components set forth in one or more of the preceding figures may be configured to perform one or more operations, techniques, processes, and/or methods as set forth in the preceding examples. For example, compute node 200, name node 102, data node 104, edge node 250, edge/IoT processing device 1950, etc., may be embodied as any of Examples 1-9, 24-33, 36, or 37 or may perform the method of any of Examples 10-16, 34, or 35.

The invention claimed is:

1. A data node for processing distributed files, the data node comprising:
   a processor;
   a memory;
   a data storage device; and
   one or more computer-readable media comprising a plurality of instructions stored thereon that, when executed by the data node, causes the data node to:
      receive an instruction to query an object of a distributed file system (DFS) stored on the data storage device of the data node, wherein the object comprises a plurality of data elements;
      determine block mapping of the object on the data storage device, wherein the block mapping indicates a location of each of the plurality of data elements on the data storage device;
      query, by the data storage device and based on the block mapping of the object, each of the plurality of data elements of the object;
      create a virtual object for each of the plurality of data elements, wherein each virtual object indicates the block mapping for the corresponding data element; and
      send the virtual object corresponding to each of the plurality of data elements to the data storage device, wherein to send the virtual object corresponding to each of the plurality of data elements to the data storage device comprises to:
         create a compute descriptor for each of the plurality of data elements, wherein each compute descriptor includes the corresponding virtual object and an indication of the query to be performed on the corresponding data element; and
         send the compute descriptor for each of the plurality of data elements to the data storage device.

2. The data node of claim 1, wherein to determine the block mapping of the object of the data storage device comprises to:
   parse a manifest of the object, wherein the manifest indicates a location of each of the plurality of data elements in the object; and
   request, from the data storage device, block mapping of each of the plurality of data elements.

3. The data node of claim 1, wherein to send the compute descriptor for each of the plurality of data elements to the data storage device comprises to send a non-volatile memory express (NVMe) pass-through command to the data storage device.

4. The data node of claim 1, wherein to determine the block mapping of the object of the data storage device comprises to parse, by the data storage device, a manifest of the object, wherein the manifest comprises a list of the plurality of data elements and locations for respective ones of the plurality of data elements, wherein then manifest is stored with the object in a file of a local file system.

5. The data node of claim 1, wherein to query, by the data storage device and based on the block mapping of the object, each of the plurality of data elements of the object comprises to, for each of the plurality of data elements:
   load the corresponding data element in local memory of the data storage device; and
   process the corresponding data element with use of a processor or accelerator of the data storage device.

6. The data node of claim 1, wherein a size of the object is between 32 megabytes and 512 megabytes.

7. A system comprising the data node of claim 1, further comprising:
   a name node comprising:
      a processor;
      a memory; and
      one or more computer-readable media comprising a plurality of instructions stored thereon that, when executed by the name node, causes the name node to:
         determine an object size for the DFS;
         combine an additional plurality of data elements into a file, the file to be split into a plurality of objects having a size equal to the DFS object size for storage on the DFS, wherein to combine the additional plurality of data elements comprises to add padding between some of the data elements so that no element of the additional plurality of data elements spans a boundary between objects of the plurality of objects;
         split the file into the plurality of objects; and
         send different objects of the plurality of objects to different data nodes in order to store the file in the DFS, wherein to send different objects of the plurality of objects to different data nodes comprises to send the object to the data node.

8. A method for processing distributed files, the method comprising:
   receiving, by a data node, an instruction to query an object of a distributed file system (DFS) stored on a data storage device of the data node, wherein the object comprises a plurality of data elements;
   determining, by the data node, block mapping of the object on the data storage device, wherein the block mapping indicates a location of each of the plurality of data elements on the data storage device;
   querying, by the data storage device and based on the block mapping of the object, each of the plurality of data elements of the object;
   creating, by the data node, a virtual object for each of the plurality of data elements, wherein each virtual object indicates the block mapping for the corresponding data element; and
   sending, by the data node, the virtual object corresponding to each of the plurality of data elements to the data storage device, wherein sending the virtual object corresponding to each of the plurality of data elements to the data storage device comprises:
      creating, by the data node, a compute descriptor for each of the plurality of data elements, wherein each compute descriptor includes the corresponding virtual object and an indication of the query to be performed on the corresponding data element; and
      sending, by the data node, the compute descriptor for each of the plurality of data elements to the data storage device.

9. The method of claim 8, wherein determining the block mapping of the object of the data storage device comprises:
   parsing, by the data node, a manifest of the object, wherein the manifest indicates a location of each of the plurality of data elements in the object; and
   requesting, by the data node and from the data storage device, block mapping of each of the plurality of data elements.

10. The method of claim 8, wherein sending, by the data node, the compute descriptor for each of the plurality of data elements to the data storage device comprises sending a non-volatile memory express (NVMe) pass-through command to the data storage device.

11. The method of claim 8, wherein determining the block mapping of the object of the data storage device comprises parsing, by the data storage device, a manifest of the object.

12. The method of claim 8, wherein querying, by the data storage device and based on the block mapping of the object, each of the plurality of data elements of the object comprises, for each of the plurality of data elements:
loading the corresponding data element in local memory of the data storage device; and
processing the corresponding data element with use of a processor or accelerator of the data storage device.

13. One or more non-transitory computer-readable media comprising a plurality of instructions stored thereon that, when executed by a data node, causes the data node to:
receive an instruction to query an object of a distributed file system (DFS) stored on a data storage device of the data node, wherein the object comprises a plurality of data elements;
determine block mapping of the object on the data storage device, wherein the block mapping indicates a location of each of the plurality of data elements on the data storage device;
query, by the data storage device and based on the block mapping of the object, each of the plurality of data elements of the object;
create a virtual object for each of the plurality of data elements, wherein each virtual object indicates the block mapping for the corresponding data element; and
send the virtual object corresponding to each of the plurality of data elements to the data storage device, wherein to send the virtual object corresponding to each of the plurality of data elements to the data storage device comprises to:
create a compute descriptor for each of the plurality of data elements, wherein each compute descriptor includes the corresponding virtual object and an indication of the query to be performed on the corresponding data element; and
send the compute descriptor for each of the plurality of data elements to the data storage device.

14. The one or more non-transitory computer-readable media of claim 13, wherein to determine the block mapping of the object of the data storage device comprises to:
parse a manifest of the object, wherein the manifest indicates a location of each of the plurality of data elements in the object; and
request, from the data storage device, block mapping of each of the plurality of data elements.

15. The one or more non-transitory computer-readable media of claim 13, wherein to send the compute descriptor for each of the plurality of data elements to the data storage device comprises to send a non-volatile memory express (NVMe) pass-through command to the data storage device.

16. The one or more non-transitory computer-readable media of claim 13, wherein to determine the block mapping of the object of the data storage device comprises to parse, by the data storage device, a manifest of the object.

17. The one or more non-transitory computer-readable media of claim 13, wherein to query, by the data storage device and based on the block mapping of the object, each of the plurality of data elements of the object comprises to, for each of the plurality of data elements:
load the corresponding data element in local memory of the data storage device; and
process the corresponding data element with use of a processor or accelerator of the data storage device.

18. A name node for distributed storage of files, the name node comprising:
a processor;
a memory; and
one or more computer-readable media comprising a plurality of instructions stored thereon that, when executed by the name node, causes the name node to:
determine an object size for a distributed file system (DFS);
combine a plurality of data elements into a file, the file to be split into a plurality of objects having a size equal to the DFS object size for storage on the DFS, wherein to combine the plurality of data elements comprises to add padding between some of the data elements so that no element of the plurality of data elements spans a boundary between objects of the plurality of objects;
split the file into the plurality of objects; and
send different objects of the plurality of objects to different data nodes in order to store the file in the DFS.

19. The name node of claim 18, wherein the object size is between 32 megabytes and 512 megabytes.

* * * * *